(12) United States Patent
Lee et al.

(10) Patent No.: US 7,136,056 B2
(45) Date of Patent: Nov. 14, 2006

(54) IMAGE QUALITY ANALYSIS METHOD AND SYSTEM FOR A DISPLAY DEVICE

(75) Inventors: Don Gyou Lee, Gyeongsangbuk-do (KR); Il Ho Kim, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 788 days.

(21) Appl. No.: 10/331,781

(22) Filed: Dec. 31, 2002

(65) Prior Publication Data

US 2003/0214586 A1    Nov. 20, 2003

(30) Foreign Application Priority Data

May 18, 2002    (KR) ................................ 2002-27646

(51) Int. Cl.
*G09G 5/00* (2006.01)
(52) U.S. Cl. ...................................... 345/207; 348/191
(58) Field of Classification Search ................ 345/207; 382/149; 348/191; 702/37; H04N 17/02
See application file for complete search history.

(56) References Cited

U.S. PATENT DOCUMENTS

| 4,989,072 | A | * | 1/1991 | Sato et al. ................... 348/180 |
| 5,479,186 | A | * | 12/1995 | McManus et al. ............ 345/11 |
| 5,650,844 | A | * | 7/1997 | Aoki et al. ............... 356/237.2 |
| 6,606,116 | B1 | * | 8/2003 | Poynter ...................... 348/189 |
| 6,714,670 | B1 | * | 3/2004 | Goldsworthy et al. ...... 382/149 |

FOREIGN PATENT DOCUMENTS

JP          08-247962          9/1996

* cited by examiner

*Primary Examiner*—Alexander Eisen
(74) *Attorney, Agent, or Firm*—Morgan, Lewis & Bockius LLP

(57) ABSTRACT

An image quality analysis method and an image quality analysis system for a display device are provided. The image quality analysis method and image quality analysis system provides a quantitative determination of image quality for display devices, thereby providing an objective and fair evaluation criterion.

41 Claims, 15 Drawing Sheets

(a)

(b)

(a)

(b)

(a)

(b)

IMAGE QUALITY ANALYSIS METHOD AND SYSTEM FOR A DISPLAY DEVICE

The present invention claims the benefit of Korean Patent Application No. 2002-27646 filed in Korea on May 18, 2002, which is hereby incorporated by reference.

BACKGROUND OF THE INVENTION

1. Field of the Invention

The present invention relates to an image quality analysis method and system, and more particularly to an image quality analysis method and system for a display device.

2. Description of the Related Art

Improved display devices are being developed for technologies relating to cathode ray tubes, liquid crystal displays, plasma display panels, organic EL (Electro Luminescence) display devices, etc. Especially, liquid crystal displays are being spotlighted as being the display devices of the next generation because of their low power consumption, light weight, reduced thickness, and low harmful electromagnetic emission.

In the related art, image quality analysis for flat display devices, such as the liquid crystal devices mentioned above, comprises turning on a liquid panel and analyzing a level of image quality of the liquid crystal display using the naked eye of an operator. The image quality analysis for such display devices is performed due to problems such as image sticking, spots, and dim. For example, in determining a degree of image sticking for the display device, when a driving pattern is changed after a specific image pattern as shown in FIG. 1 is output to the display device for a long time, a determination on how much the specific image pattern remains is made. FIG. 1 is view illustrating an example of image pattern used for an estimation of image quality for a general display device according to the related art.

However, such an image quality analysis by the naked eye of the operator can produce differences between check results due to different skills of operators. In addition, even in the analysis by the same operator, a level of precision may not be uniform due to the operator's different physical conditions at different points of time. Accordingly, objective numerical values cannot be provided for the image quality of display device analyzed by the naked eye of an operator. Also, the subjectivity of the operator may intervene in the analysis. In particular, when the uniformity of image quality of the display device is checked, even in an analysis by the same operator, there occurs a significant difference in the evaluation of uniformity of image quality depending on a view angle of the operator viewing a screen and illumination conditions. In addition, a level of recognition by persons for badness of dim, formation of spots, etc. in the display device is varied depending on the brightness of an image displayed in the screen and the surrounding illumination conditions. In general, when the brightness of the displayed image is high, the dim badness, the spot formation and the like will not be well perceived even when there is basic badness in the display device (for example, dim formation due to badness of a driver IC).

As can be seen from the foregoing description, as the subjectivity of the operator intervenes in the evaluation of image quality of the display device, it is difficult to propose an objective and fair evaluation criterion between manufacturers and purchasers of display devices.

SUMMARY OF THE INVENTION

Accordingly, the present invention is directed to an image quality analysis method and system that substantially obviates one or more of the problems due to limitations and disadvantages of the related art.

An object of the present invention is to provide an image quality analysis method and system by which a level of image quality for display devices can be quantified by objective numerical values, so that an objective evaluation can be carried out.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an image quality analysis method for a display device comprises the steps of outputting an image pattern to the display device for a first period of time; dividing a screen display region on which the image pattern is displayed into a plurality of sub-regions; producing first measurement data corresponding to image quality during the first period of time for the plurality of sub-regions; outputting the image pattern to the display device for a second period of time; producing second measurement data corresponding to image quality during the second period of time for the plurality of sub-regions; normalizing the image pattern displayed on the screen display region; and quantitatively detecting an output level of image sticking of the image pattern from the normalized image pattern using the first measurement data and the second measurement data.

In another aspect, an image quality analysis method for a display device comprises the steps of outputting a first image pattern having a first brightness to the display device for a first period of time; dividing a screen display region on which the reference image pattern is displayed into a plurality of sub-regions; producing first measurement data corresponding to image quality during the first period of time for the plurality of sub-regions; outputting a second image pattern having a second brightness lower than the first brightness to the display device for a second period of time; producing second measurement data corresponding to image quality during the second period for the plurality of sub-regions; normalizing the image pattern displayed on the screen display region; and quantitatively evaluating image badness of the display device from the normalized image pattern using the first measurement data and the second measurement data.

In another aspect, an image quality analysis system for a display device of which image quality is to be analyzed comprises an image acquisition portion to detect optical data of an image to be displayed on a screen display region of the display device; a data processor to produce measurement data corresponding to image quality of the display device using the optical data detected by the image acquisition portion; and an image quality level detector to normalize the image pattern displayed on the screen display region and to quantitatively evaluate an image quality level of the display device from the normalized image pattern using the measurement data produced from the data processor for a plurality of images output to the display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
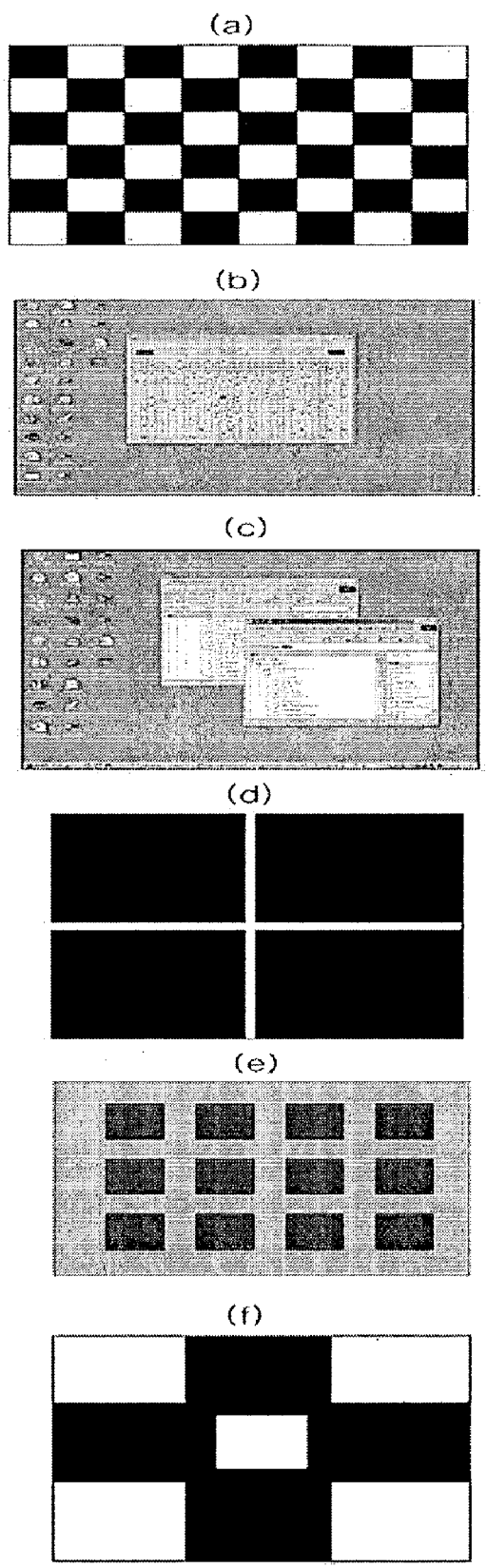
FIGS. 1a to 1f are views showing examples of image pattern used for image quality evaluation for a display device according to the related art.
Figure 2:
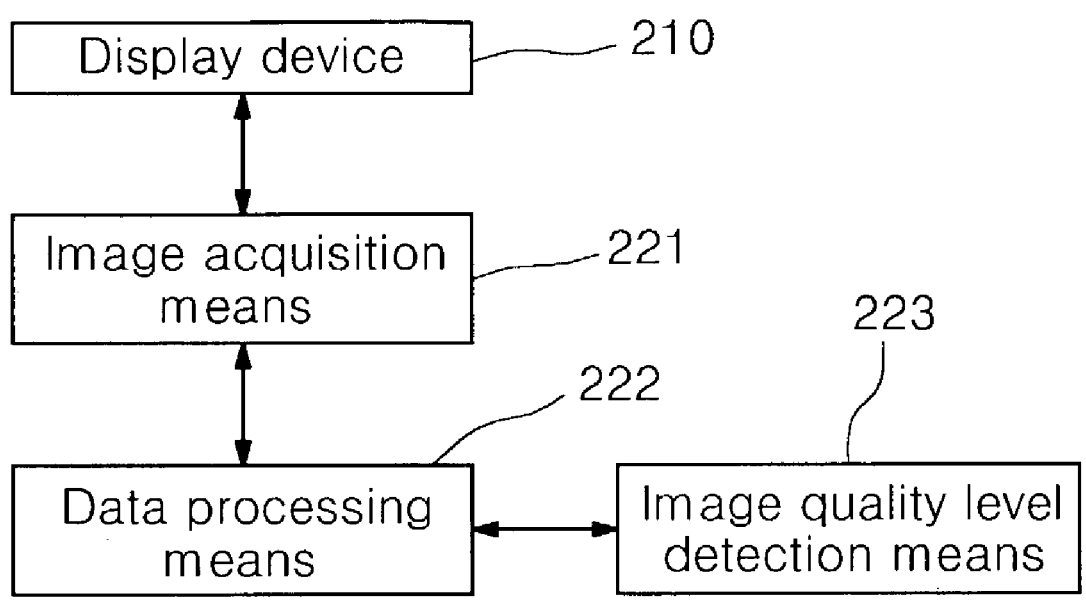
FIG. 2 is a schematic view for illustrating a structure of an image quality analysis system of a display device according to an exemplary embodiment of the present invention.

FIG. 2 is a schematic view for illustrating a structure of an image quality analysis system of a display device according to the present invention. Referring to FIG. 2, an image quality analysis system for a display device according to the present invention comprises an image acquisition portion 221 for detecting optical data of an image to be displayed on a screen display region from the display device 210, for example, a liquid crystal device, a plasma display panel, an organic EL display device, etc., whose image quality is to be analyzed; a data processing portion 222 for producing measurement data corresponding to image quality of the display device 210 using the optical data detected by the image acquisition portion 221; and an image quality level detection portion 223 for normalizing the image pattern displayed on the screen display region and quantitatively detecting an image quality level of the display device 210 from the normalized image pattern by using the measurement data produced from the data processing portion 222 for a plurality of images output to the display device 210. Here, the image acquisition portion 221 including 2-CCD (Charge Coupled Device) luminance meter & colorimeter, etc. detects luminance data and chromaticity data from each detection region (for example, each pixel unit) of the display device 210.

Using the image quality analysis system for a display device as constructed above, it is possible to perform a quantitative analysis for image sticking, dim badness (or non-uniformity in dimming characteristics), spots badness (or spots formed in the display image), etc. of the display device.

Figure 3:
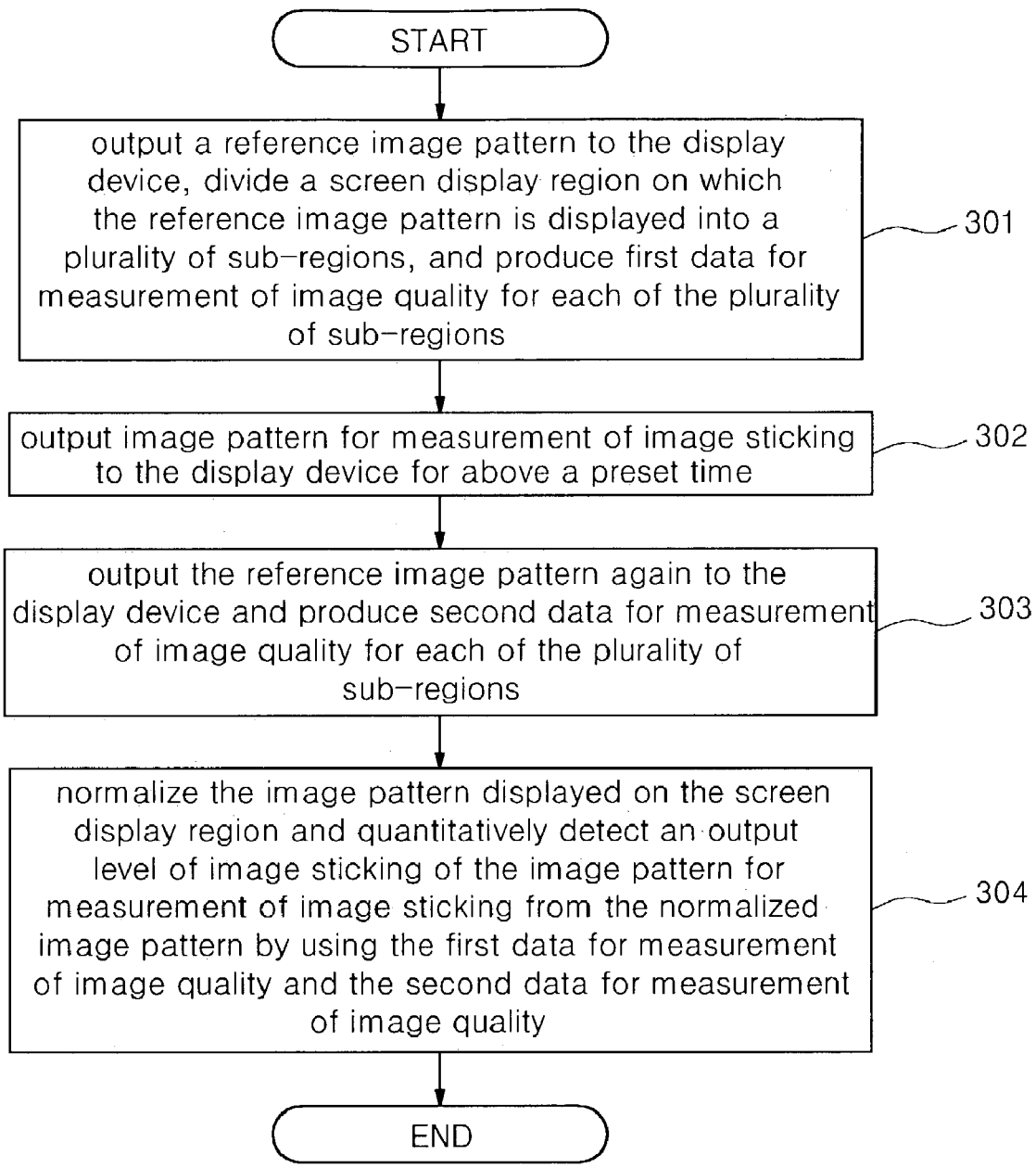
FIG. 3 is a flow chart for explaining a procedure of quantifying a level of image sticking of a display device through an image quality analysis method for a display device according to an exemplary embodiment of the present invention.

Now, an image quality analysis method for each defect characteristic of the display device will be sequentially described. FIG. 3 is a flow chart for explaining a procedure of quantifying a level of image sticking of a display device through an image quality analysis method for the display device according to the present invention.

First, a reference image pattern is output to the display device, a screen display region on which the reference image pattern is displayed is divided into a plurality of sub-regions, and first measurement data for each of the plurality of sub-regions is produced (Step 310). At that time, the image pattern output to the display device can be implemented in various ways through an image pattern generator, etc (even in case of same image pattern, the luminance for each image pattern can be different). Here, an image pattern output as a half gray image pattern type for the entire screen will be explained as an example.

As the measurement data produced with respect to each of the plurality of sub-regions, either luminance or chromaticity data is basically available. At that time, basic optical luminance and chromaticity data can be detected from the display device using an image acquisition portion such as a 2-CCD luminance meter & colorimeter. The luminance data detected from the screen region of the display device can be expressed by the following matrix form depending on a detection position:

$$\begin{bmatrix} L_{11} & L_{12} & \cdots & L_{1n} \\ L_{21} & L_{22} & \cdots & L_{2n} \\ \cdots & \cdots & \cdots & \cdots \\ L_{m1} & L_{m2} & \cdots & L_{mn} \end{bmatrix}$$

Also, the chromaticity data detected from the screen region of the display device can be expressed by the following matrix form depending on a detection position.

$$\begin{bmatrix} (x,y)_{11} & (x,y)_{12} & \cdots & (x,y)_{1n} \\ (x,y)_{21} & (x,y)_{22} & \cdots & (x,y)_{2n} \\ \cdots & \cdots & \cdots & \cdots \\ (x,y)_{m1} & (x,y)_{m2} & \cdots & (x,y)_{mn} \end{bmatrix}$$

In addition, with reference to the optical luminance/chromaticity data detected through the image acquisition means, color difference ($\Delta Euv$) data representing a difference of color sense felt by humans are calculated and the calculated color difference data can be used to perform the image quality analysis for the display device. At that time, when the color difference data is obtained, a particular point—for example, a center point in the screen display region—can be selected as a reference point. Also, when the measurement data corresponding to image quality is calculated from the display device, the screen display region is divided into pixel units and the measurement data can be calculated with respect to the pixel units. Further, of the pixel units, the measurement data can be calculated with respect to each pixel unit positioned at prescribed equal intervals from a basis pixel of the respective pixel unit.

Using the luminance data and the chromaticity data detected through the image acquisition portion, a color difference ($\Delta Euv$) data can be produced as will now be explained. In producing the color difference data, the following equations are produced with reference to VESA FPDM (Flat Panel Display Measurement) V.2.0.

$$L^* = 116 \times \left(\frac{Y'}{Y_n}\right)^{1/3} - 16$$

$$\Delta L^* = L_1^* - L_2^*$$

$$u^* = 13 \times L^* \times (u' - u'_w)$$

$$v^* = 13 \times L^* \times (v' - v'_w)$$

$$\Delta u^* = u^*_1 - u^*_2, \quad \Delta v^* = v^*_1 - v^*_2$$

$$\Delta Euv = [(\Delta L^*)^2 + (\Delta u^*)^2 + (\Delta v^*)^2]^{1/2}$$

With reference to the above produced luminance data and chromaticity data of the display device, the color difference ($\Delta Euv$) data produced from the screen display region can be expressed by the following matrix form:

$$\begin{bmatrix} \Delta Euv_{11} & \Delta Euv_{12} & \cdots & \Delta Euv_{1n} \\ \Delta Euv_{21} & \Delta Euv_{22} & \cdots & \Delta Euv_{2n} \\ \cdots & \cdots & \cdots & \cdots \\ \Delta Euv_{m1} & \Delta Euv_{m2} & \cdots & \Delta Euv_{mn} \end{bmatrix}$$

In the image quality analysis method for the display device according to the present invention, it is possible to perform a quantitative image quality analysis using the luminance data, chromaticity data (both of which are detected from the screen display region), and the color difference data (calculated from the luminance data and the chromaticity data).

A method of detecting an image sticking level using the luminance data detected from the screen display region of the display device will now be explained.

Basically, even in case that data other than the luminance data is used, the image sticking level can be quantitatively estimated by taking a procedure similar to the procedure to be described below. When an image output to the screen display region is displayed using first measurement data corresponding to image quality, for example, the luminance data produced in Step 301, the image can appear as in FIG. 4.

Figure 4:
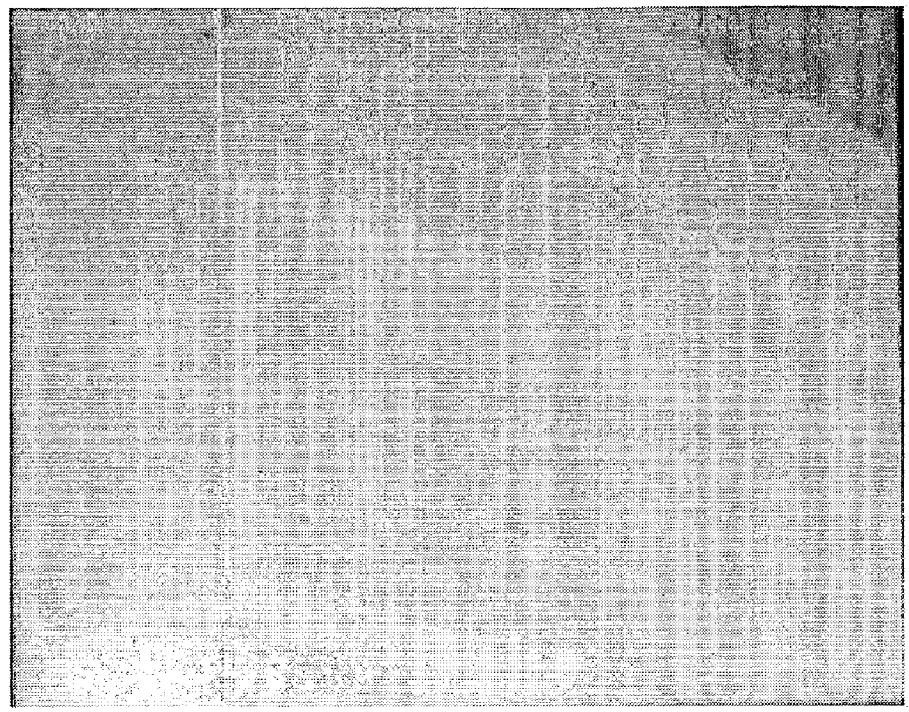
FIG. 4 shows a reference image pattern used for detecting a level of image sticking through an image quality analysis method for a display device according to an exemplary embodiment of the present invention.

FIG. 4 is a view showing a reference image pattern used for detecting the image sticking level through an image quality analysis method for a display device according to an exemplary embodiment of the present invention. In an exemplary embodiment of the present invention, the half gray for the entire screen is output as the reference image pattern. A vertical line at the left in FIG. 4 appears due to a line defect generated in the display device to be measured.

At that time, the first measurement data detected from the screen region of the display device can be expressed by the following matrix form:

$$\begin{bmatrix} L_{11} & L_{12} & \cdots & L_{1n} \\ L_{21} & L_{22} & \cdots & L_{2n} \\ \cdots & \cdots & \cdots & \cdots \\ L_{m1} & L_{m2} & \cdots & L_{mn} \end{bmatrix}$$

After the first measurement data are detected for the reference image pattern in Step 301, an image pattern for measurement of image sticking is output to the display device for above a preset time (Step 302).

Figure 5:
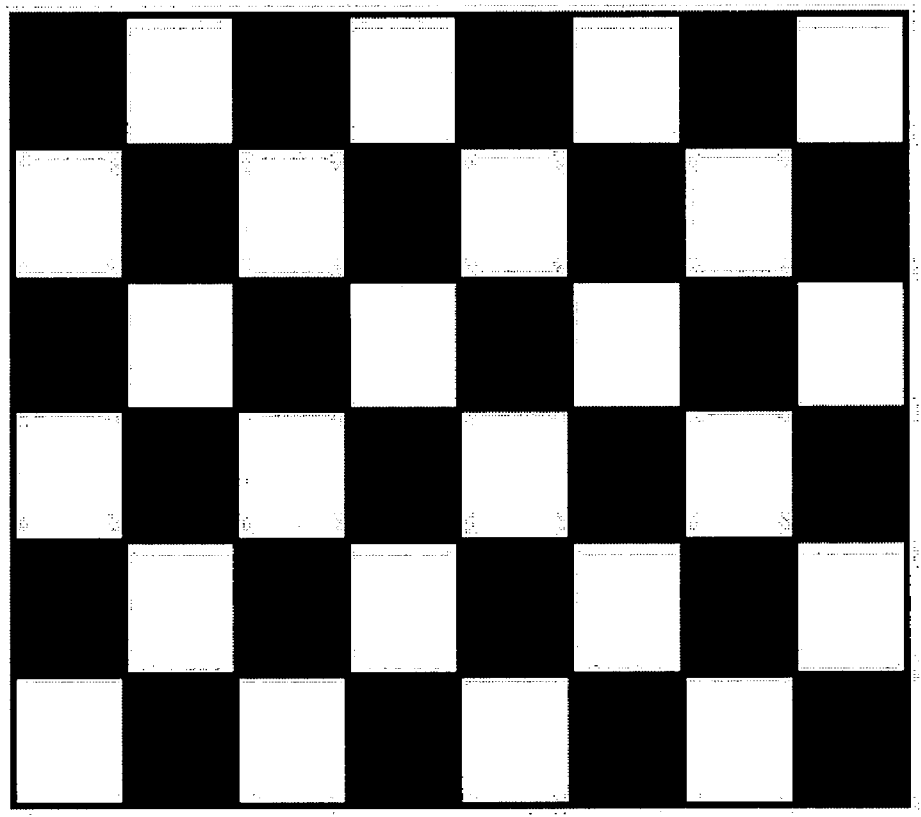
FIG. 5 shows an image pattern for measurement of image sticking used for detecting a level of image sticking, through an image quality analysis method for the display device according to an exemplary embodiment of the present invention.

Here, as the image pattern for measurement of image sticking in the exemplary embodiment, an image having a form of 8×6 chessboard as shown in FIG. 5 was used. This image facilitates grasping an affection of image sticking. Moreover, this image having the form of 8×6 chessboard is made to generate significant luminance differences between adjacent locations forming each chessboard pattern. In order to grasp the image sticking level generated in the display device, the image pattern for measurement of image sticking is output for a long time (about 2 hours in this exemplary embodiment).

After Step 302, the reference image pattern is again output to the display device, and second measurement data corresponding to image quality for each of the plurality of sub-regions is produced (Step 303). Here, when an image output to the screen display region is displayed using the produced second measurement data, for example, the luminance data, the image can appear as in FIG. 6.

Figure 6:
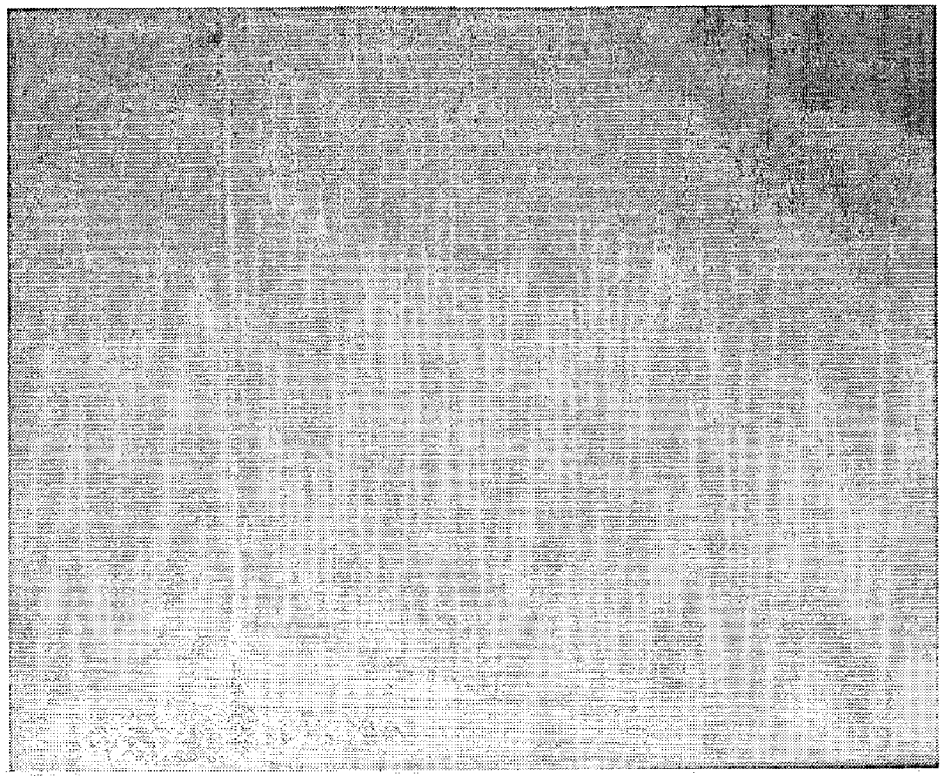
FIG. 6 is a view showing a repeatedly output reference image pattern used for detecting a level of image sticking after the image pattern for measurement of image sticking is output for a long time, through an image quality analysis method for a display device according to an exemplary embodiment of the present invention.

FIG. 6 is a view showing a repeatedly output reference image pattern used for detecting a level of image sticking after the image pattern for measurement of image sticking is output for a long time through an image quality analysis method for the display device according to an exemplary embodiment of the present invention. In the exemplary embodiment of the present invention, the half gray for the entire screen is output as the reference image pattern, similar to the reference image pattern used in Step 301. A vertical line at the left in FIG. 6 appears due to a line defect generated in the display device to be measured.

At that time, the second measurement data detected from the screen region of the display device can be expressed by the following matrix form:

$$\begin{bmatrix} IS_{11} & IS_{12} & \cdots & IS_{1n} \\ IS_{21} & IS_{22} & \cdots & IS_{2n} \\ \cdots & \cdots & \cdots & \cdots \\ IS_{11} & IS_{m2} & \cdots & IS_{mn} \end{bmatrix}$$

In addition, positions of particular pixel units at which the second measurement data are detected are selected to become equal to positions of particular pixel units at which the first are detected. Namely, data detection positions are adjusted such that the positions of particular pixel units at which the first measurement data $L_{11}$, $L_{12}$ . . . are detected become respectively equal to the positions of particular pixel units at which the second measurement data $IS_{11}$, $IS_{12}$ . . . are detected.

Then, using the detected first measurement data $L_{11}$, $L_{12}$ . . . and the detected second measurement data $IS_{11}$, $IS_{12}$ . . . , the image pattern displayed on the screen display region is normalized and an output level of image sticking of the image pattern for measurement of image sticking is quantitatively detected from the normalized image pattern (Step 304). When the output level of image sticking of the image pattern for measurement of image sticking is detected, quantitative image quality evaluations for a line image sticking and a face image sticking are performed.

Prior to description of the quantitative image quality evaluations for the line image sticking and the face image sticking, a normalization procedure of the first measurement data $L_{11}$, $L_{12}$ . . . and the second measurement data $IS_{11}$, $IS_{12}$ . . . , which are produced in Step 301 and Step 304 respectively, will be described. Here, the normalization procedure may be accomplished by selecting one of the first measurement data $L_{11}$, $L_{12}$ . . . and the second measurement data $IS_{11}$, $IS_{12}$ . . . and dividing the other by the selected one. Here, the division of the second measurement data by the first measurement data will be described as an example. Data produced through such a normalization procedure can be expressed by the following matrix form:

$$\begin{bmatrix} \frac{IS_{11}}{L_{11}} & \frac{IS_{12}}{L_{12}} & \cdots & \frac{IS_{13}}{L_{13}} \\ \frac{IS_{21}}{L_{21}} & \frac{IS_{22}}{L_{22}} & \cdots & \frac{IS_{2n}}{L_{2n}} \\ \cdots & \cdots & \cdots & \cdots \\ \frac{IS_{m1}}{L_{m1}} & \frac{IS_{m2}}{L_{m2}} & \cdots & \frac{IS_{mn}}{L_{mn}} \end{bmatrix}$$

Figure 7:
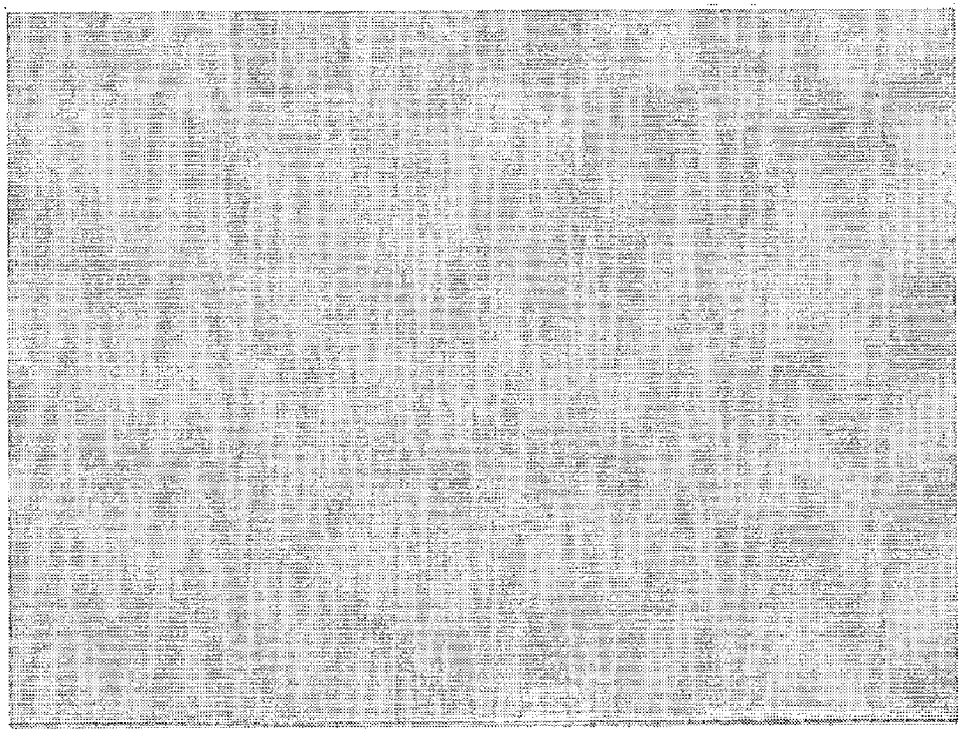
FIG. 7 shows screen output state displayed from data normalized by using first and second measurement data through an image quality analysis method for a display device according to an exemplary embodiment of the present invention.
Figure 8:
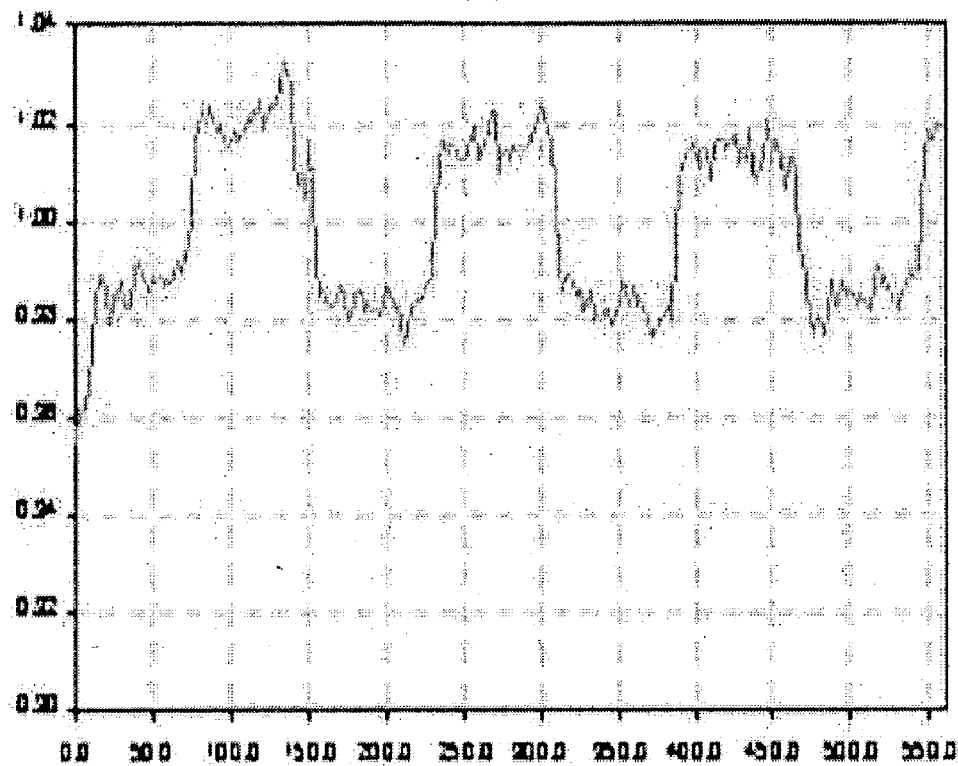
FIGS. 8 to 11 show data extraction and screen display state based on a quantitative estimation of image sticking through an image quality analysis method for a display device according to an exemplary embodiment of the present invention.
Figure 8:
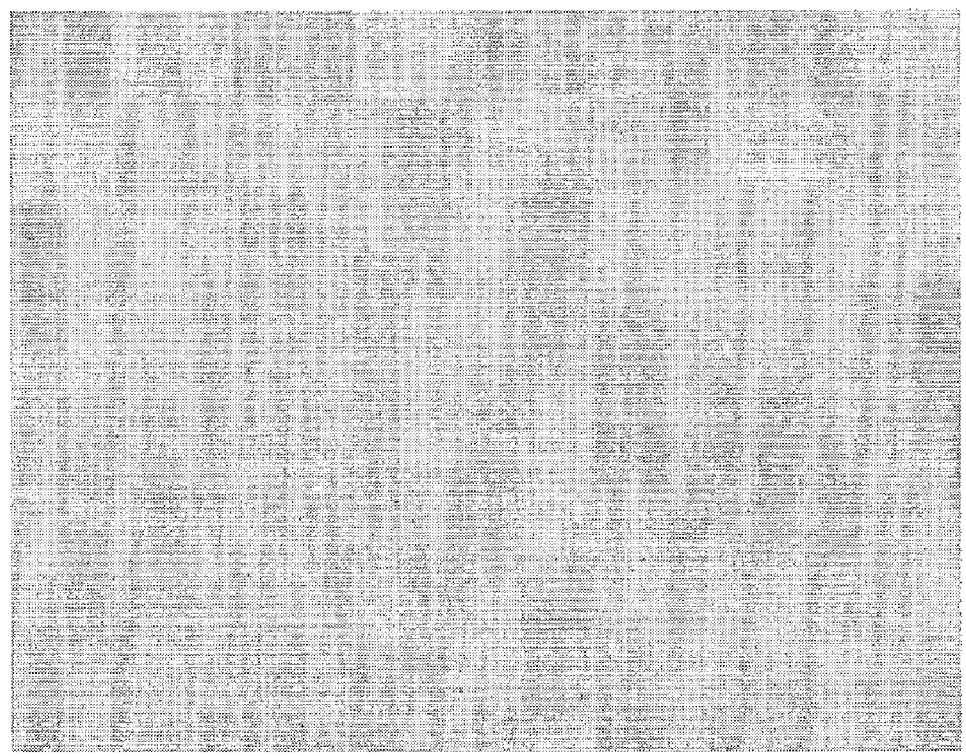
Figure 9:
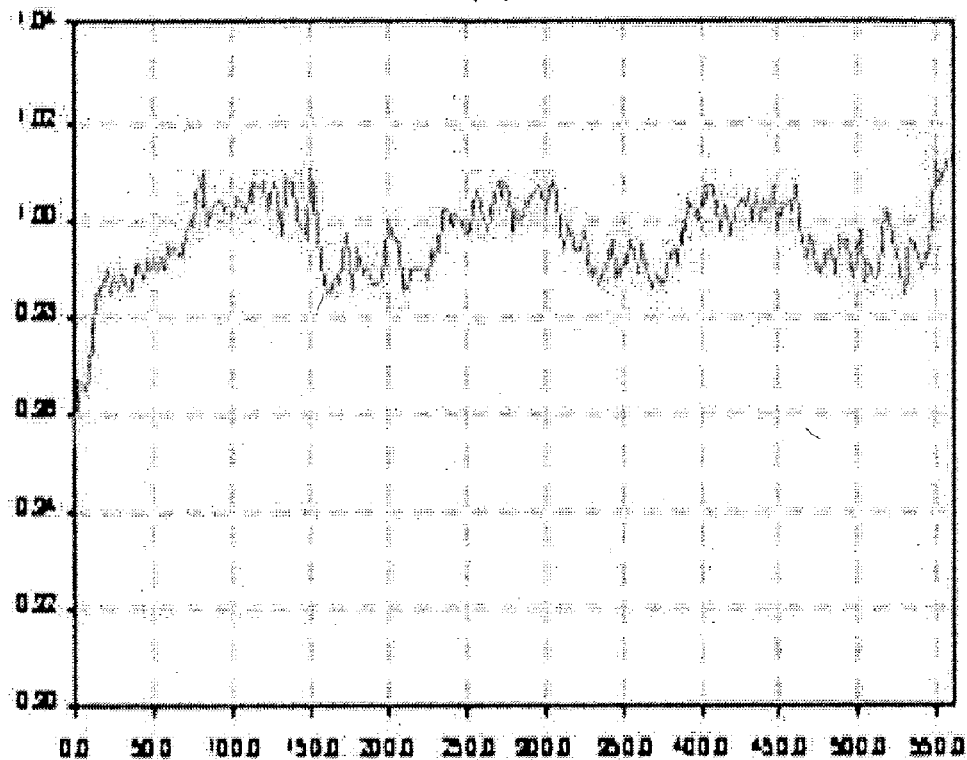
Figure 9:
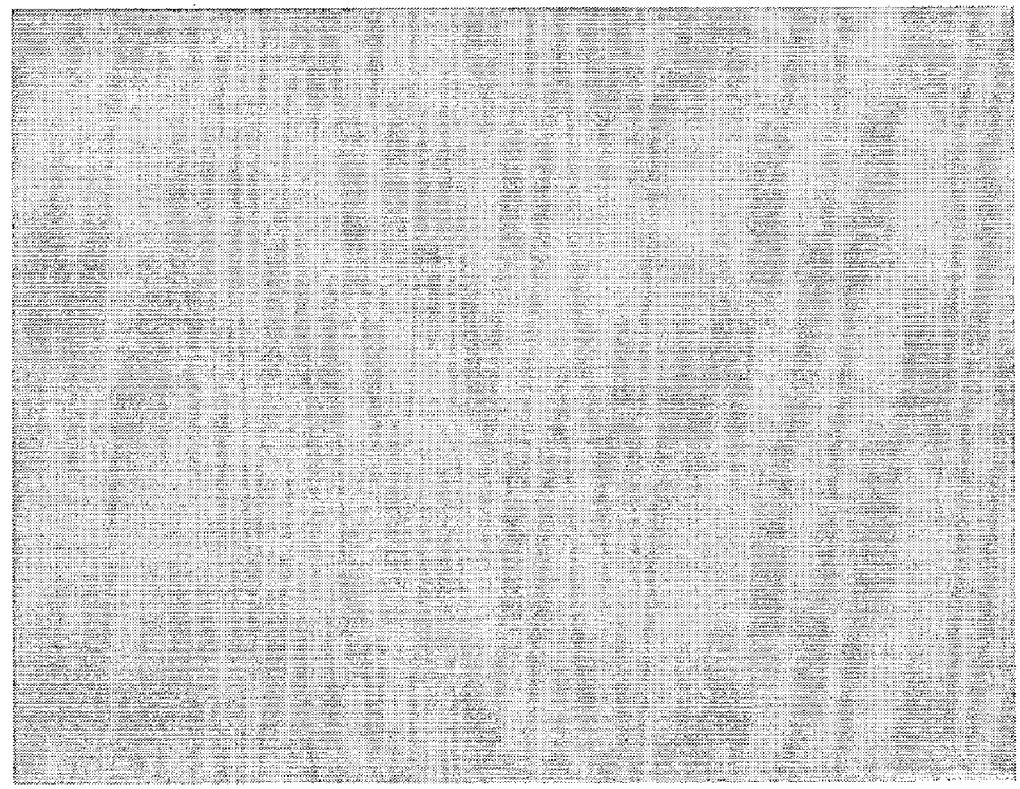
Figure 10:
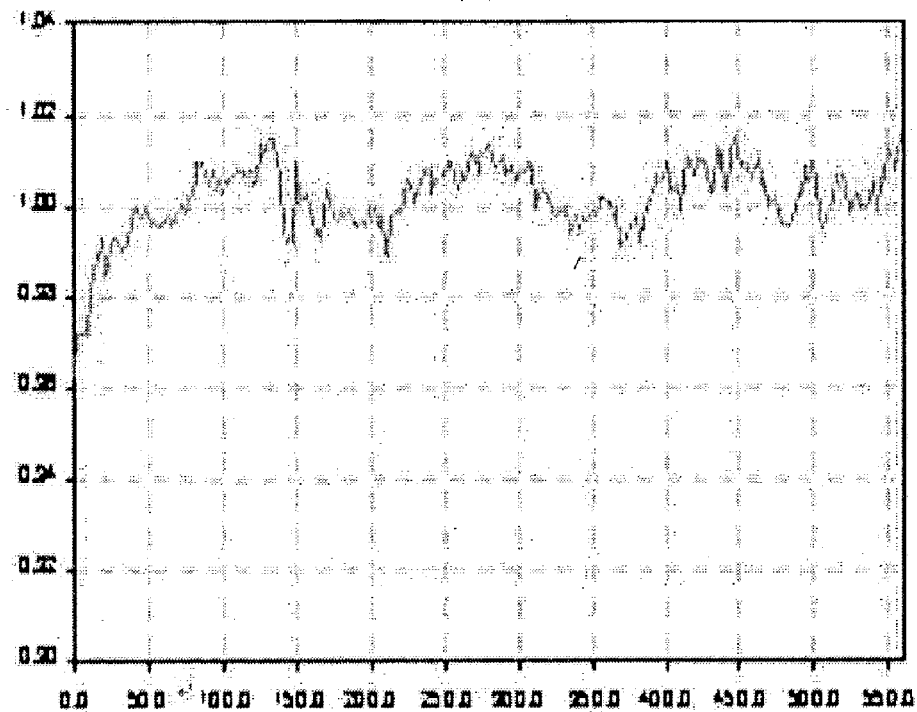
Figure 10:
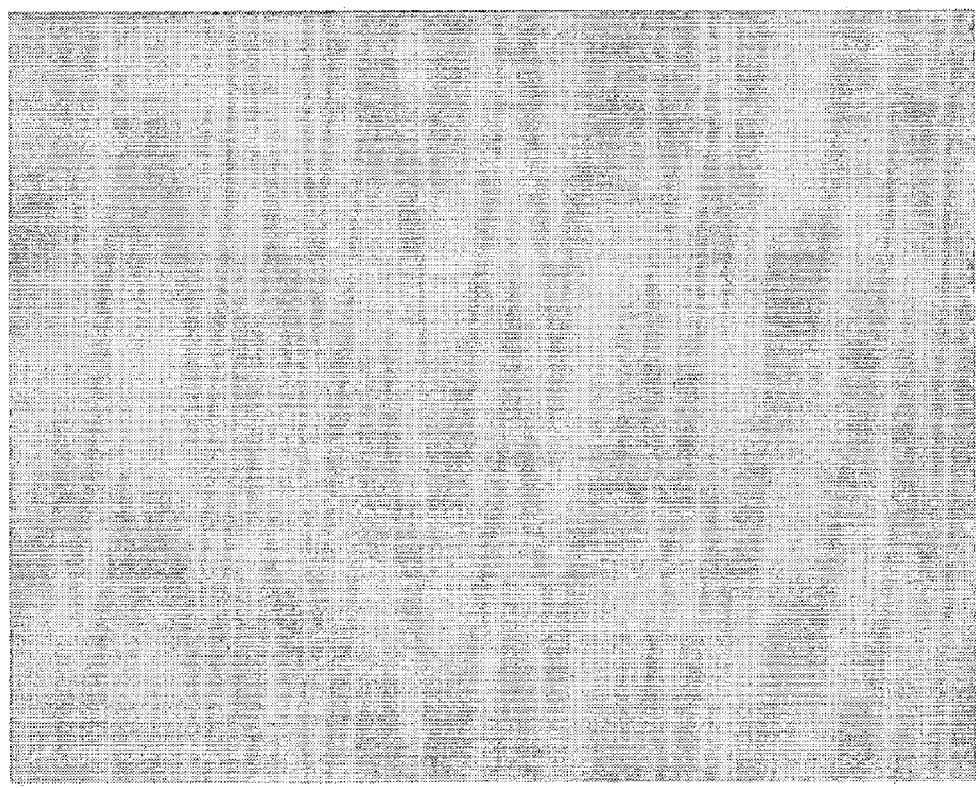
Figure 11:
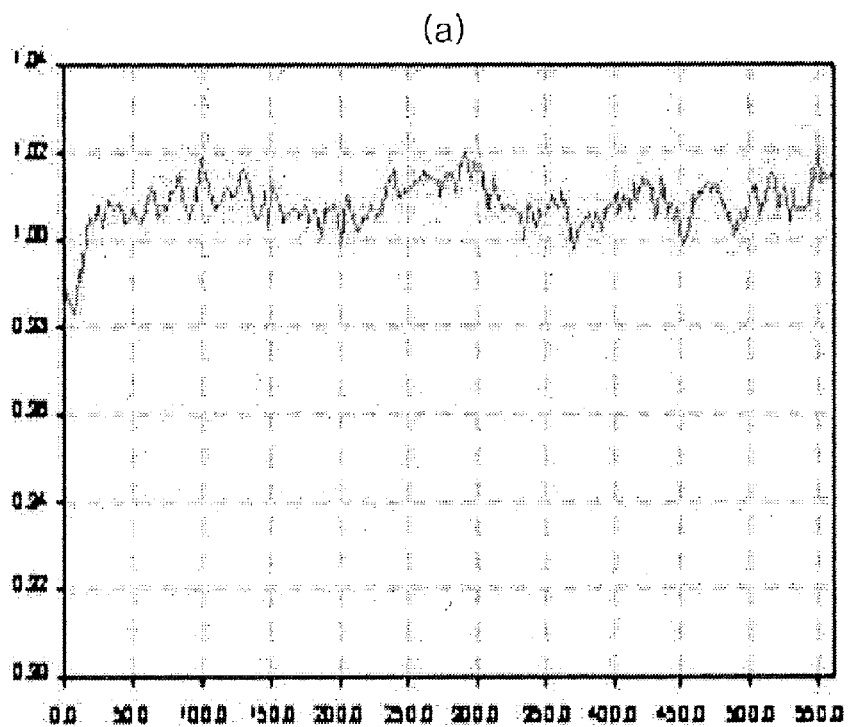
Figure 11:
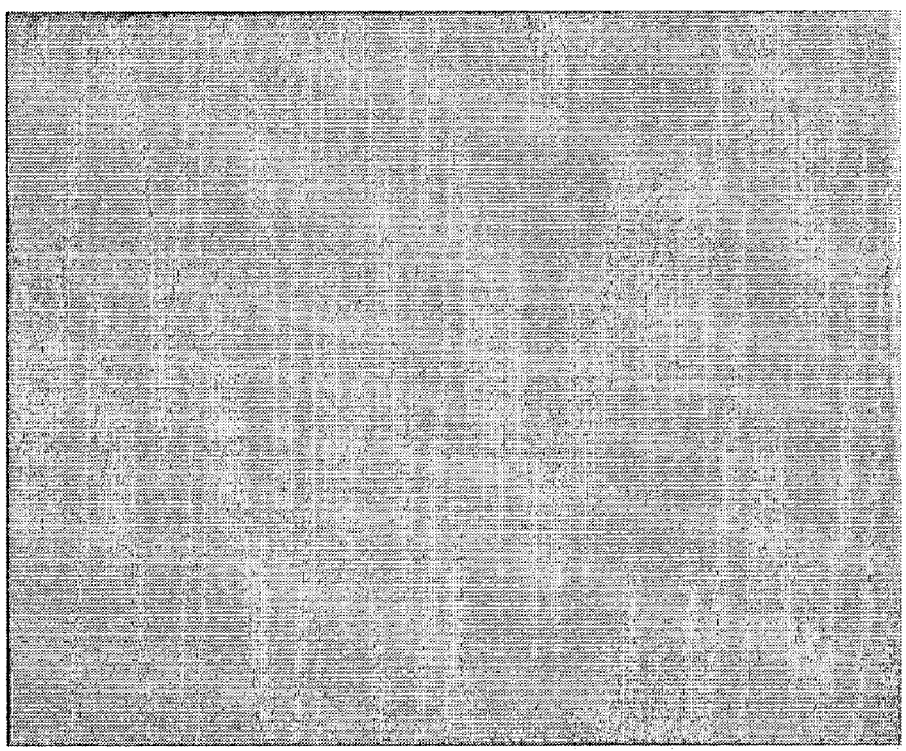

On the other hand, the screen display region of the display device displayed from the above data appears as shown in FIG. 7. Here, FIG. 7 shows screen output state displayed from data normalized using the first and second measurement data through an image quality analysis for a display device according to an exemplary embodiment of the present invention. As such, the following result can be obtained from FIGS. 4, 6, and 7.

When the screen display regions shown in FIGS. 4 and 6 are compared each other, it can be seen that they have little visual difference. As described earlier, FIG. 4 shows the screen output state displayed from the data detected under a state that the reference image pattern is output but under a state that the image pattern for measurement of image sticking (for example, chessboard pattern) is not output, and FIG. 6 shows the screen output state displayed from the data detected under a state that the reference image pattern is output after the image pattern for measurement of image sticking is output for a long time. The little visual difference between the screen output states shown in FIGS. 4 and 6 as described above reflect that there is no variation of the screen output state regardless of the presence of output of the image pattern for measurement of image sticking. Namely, it is meant that the display device for which the check is performed has a good image quality characteristic, thereby preventing the image sticking from being generated.

However, unlike these results derived from FIGS. 4 and 6, when the image quality level is determined on the basis of FIG. 7, it is concluded that the display device for which the check is performed has a poor image quality characteristic, producing serious image sticking. In other words, by the image quality analysis method for the display device according to the present invention, since even an image sticking not identified by a naked eye of a person can be detected, evaluation on the presence of image sticking of the display device can be more precisely performed. In connection with this, a description will be given with reference to FIG. 7.

It can be seen that the screen output state shown in FIG. 7 appears similar to the image pattern (chessboard shape) for measuring the image sticking output in Step 302. The image pattern (chessboard shape) for measuring image sticking output in Step 302 remains as the image sticking in the second measurement data produced in Step 303, thereby detecting the remaining image sticking. Here, it is noted that a good image quality evaluation method for the display device can be obtained through a normalization procedure using the reference image pattern.

Figure 12:
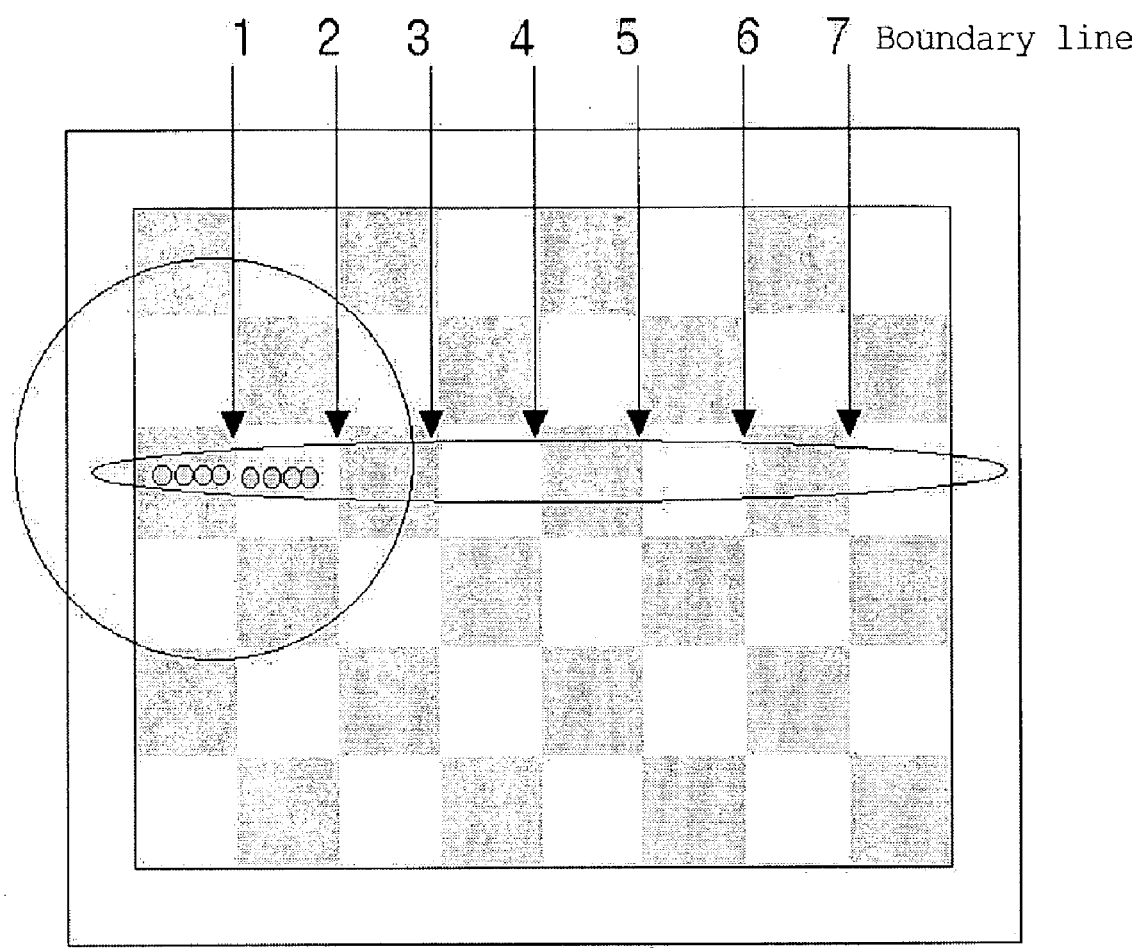
FIG. 12 is a view for explaining data detection position for quantitatively analyzing line image sticking and face image sticking, through an image quality analysis method for a display device according to an exemplary embodiment of the present invention.

On the other hand, FIGS. 8 to 11 are views showing data extraction and screen display state based on a quantitative estimation of image sticking through an image quality analysis method for the display device according to the present invention. As shown in FIGS. 8 to 11, data on strong level effect (FIG. 8), middle level effect (FIG. 9), weak level effect (FIG. 10), and very weak level effect (FIG. 11) by the image sticking can be obtained respectively. With reference to FIG. 12, quantitative image quality evaluations for a line image sticking and a face image sticking will be explained.

FIG. 12 is a view for explaining data detection position for quantitatively analyzing line image sticking and face image sticking, through an image quality analysis method for the display device according to the present invention. In this exemplary embodiment, as the image pattern for measurement of image sticking in Step 302, an image having a form of 8×6 chessboard was used. Accordingly, as shown in FIGS. 8(a) and 8(b), there occurs a periodic variation of the luminance data in which the image sticking is detected and the bright portions and the dark portions appear alternately in the screen display.

Referring to FIG. 12, when the form of 8×6 chessboard is used for the image pattern for measurement of image sticking, seven boundary lines are generated for one horizontal line. With this, the quantitative evaluations for the line image sticking and the face image sticking are performed by extracting data from both regions on the basis of these seven boundary lines. At that time, when the quantitative evaluation for the line image sticking is performed, measurement data corresponding to image quality is obtained in both regions centered on the boundary lines at which the line image sticking is generated. Of the obtained measurement data, if data having a larger value is set to Nmax and data having a smaller value is set to Nmin, a quantitative level for the line image sticking can be expressed as:

$$ISV_L = \left(\frac{N_{max} - N_{min}}{N_{max}}\right) \times 100$$

Figure 13:
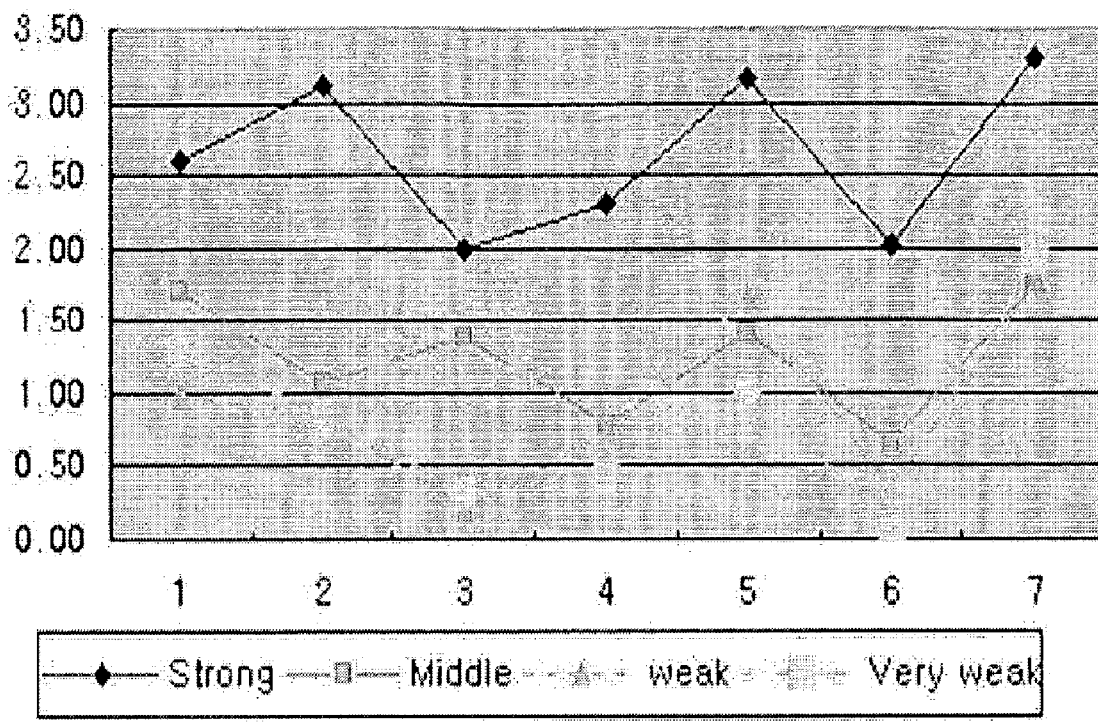
FIG. 13 shows a quantitative result for the line image sticking of each of display devices for which an image sticking check is performed through an image quality analysis method for a display device according to an exemplary embodiment of the present invention.

A result of the quantitative evaluation analysis for the line image sticking as expressed above is shown in Table 1 and FIG. 13. Here, FIG. 13 is a view showing a quantitative analysis result for the line image sticking of each of display devices for which the image sticking check is performed, through an image quality analysis method for the display device according to an exemplary embodiment of the present invention.

TABLE 1

| Region | Strong | Middle | weak | Very weak |
| --- | --- | --- | --- | --- |
| First | 2.61 | 1.17 | 0.97 | 1.30 |
| Second | 3.11 | 1.06 | 0.85 | 0.86 |
| Third | 1.98 | 1.38 | 0.20 | 0.32 |
| Fourth | 2.31 | 0.79 | 0.74 | 0.42 |
| Fifth | 3.16 | 1.41 | 1.65 | 1.03 |
| Sixth | 2.01 | 0.64 | 0.34 | 0.10 |
| Seventh | 3.31 | 1.74 | 1.78 | 1.92 |
| Average | 2.64 | 1.25 | 0.93 | 0.85 |
| Maximum | 3.31 | 1.74 | 1.78 | 1.92 |

In addition, when the quantitative evaluation for the line image sticking is performed, a ratio of one value to the other value or a difference between two values can be represented as the quantitative level for the line image sticking by using Nmax value and Nmin value. A quantitative level can be defined in various ways such as:

$$ISV_L = (N_{max} - N_{min})$$

$$ISV_L = \left(\frac{N_{max}}{N_{min}}\right)$$

$$ISV_L = \left(\frac{N_{min}}{N_{max}}\right)$$

In addition, when the quantitative evaluation for the face image sticking is performed, a plurality measurement data are obtained in both regions centered on the boundary lines at which the face image sticking is generated. Then, each of averages is calculated by using the obtained plurality of measurement data (although four data detection positions are marked with a basis of the boundary lines in FIG. 12, it should be understood that even much more data is actually detected).

If an average value in a region having larger values is set to N_average_max and an average value in a region having smaller values is set to N_average_min, a quantitative level for the face image sticking can be expressed by the following equation.

$$ISV_F = \left(\frac{N_{-average-max} - N_{-average-min}}{N_{-average-max}}\right) \times 100$$

Figure 14:
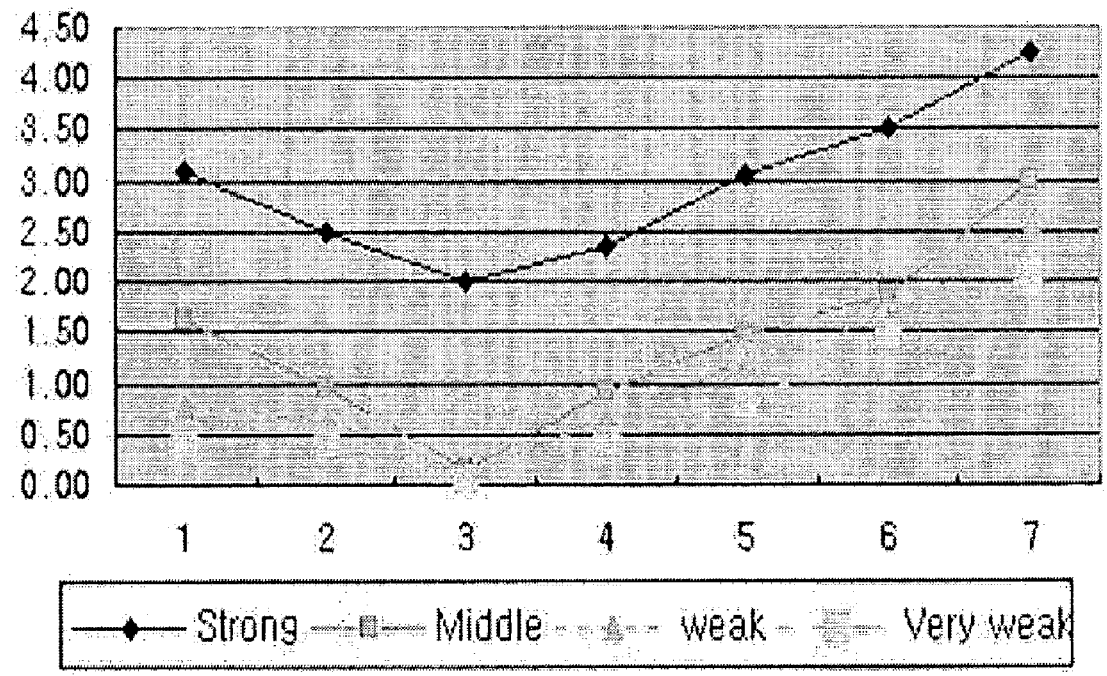
FIG. 14 shows a quantitative result for the face image sticking of the each of a plurality of display devices for which an image sticking check is being performed through an image quality analysis according to an exemplary embodiment of the present invention.

A result of the quantitative evaluation analysis for the face image sticking as expressed above is shown in Table 2 and FIG. 14. Here, FIG. 14 is a view showing a quantitative result for the face image sticking of each of the display devices for which image sticking is checked through an image quality analysis according to an exemplary embodiment of the present invention.

TABLE 2

| Region | Strong | Middle | weak | Very weak |
| --- | --- | --- | --- | --- |
| First | 3.09 | 1.62 | 0.78 | 0.40 |
| Second | 2.49 | 0.96 | 0.62 | 0.42 |
| Third | 2.01 | 0.16 | 0.11 | 0.03 |
| Fourth | 2.37 | 0.93 | 0.69 | 0.41 |
| Fifth | 3.05 | 1.47 | 1.18 | 0.82 |
| Sixth | 3.51 | 1.87 | 1.63 | 1.49 |
| Seventh | 4.26 | 2.98 | 2.57 | 2.06 |
| Average | 2.97 | .1.43 | 1.08 | 0.80 |
| Maximum | 4.26 | 2.98 | 2.57 | 2.06 |

In addition, when the quantitative evaluation for the face image sticking is performed, a ratio of one value to the other value or a difference between two values can be represented as the quantitative level for the face image sticking by using N_average_max value and N_average_min value. Equations representing such a quantitative level can be defined in various ways as follows:

$$ISV_F = (N_{-average-max} - N_{-average-min})$$

$$ISV_F = \left(\frac{N_{-average-max}}{N_{-average-min}}\right)$$

$$ISV_F = \left(\frac{N_{-average-min}}{N_{-average-max}}\right)$$

Figure 15:
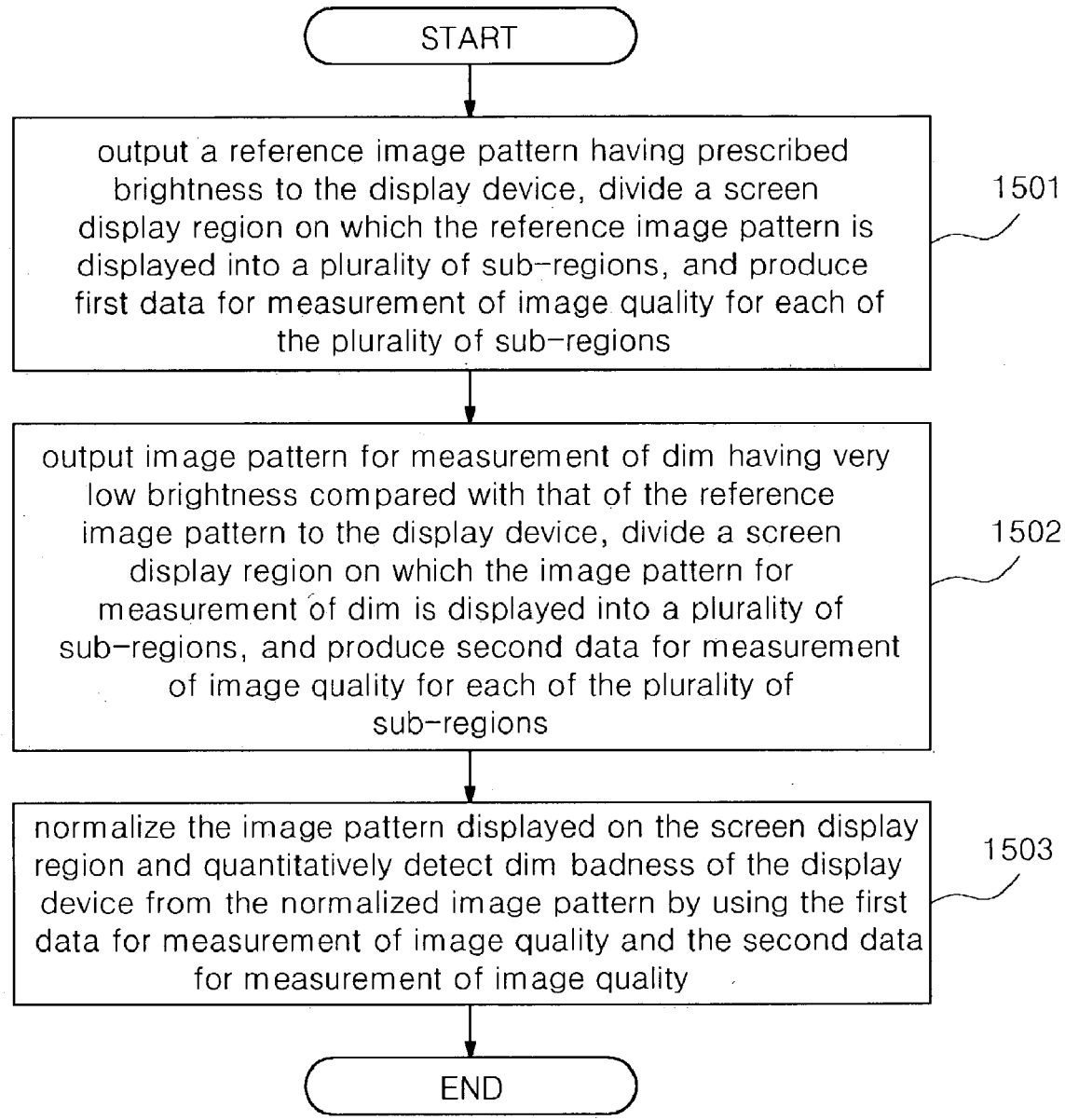
FIG. 15 is a flow chart for explaining a procedure of quantifying a dim badness level of a display device through an image quality analysis according to an exemplary embodiment of the present invention.

Through the procedures as described above, the line image sticking and the face image sticking for the display device can be quantitatively evaluated. On the other hand, through an image quality analysis method for the display device according to the present invention, levels of screen badness other than the image sticking of the display device as described above can be quantified and evaluated. Here, the screen problems other than image sticking include the dim badness and the spots badness. FIG. 15 is a flow chart for explaining a procedure of quantifying the dim badness level of the display device, through an image quality analysis according to an exemplary embodiment of the present invention.

Then, with reference to FIG. 15, as another analysis example of an image quality analysis method for the display device according to the present invention, a method of quantifying a dim badness level will be considered. First, a reference image pattern having predetermined luminance is output to the display device, a screen display region on which the reference image pattern is displayed is divided into a plurality of sub-regions, and first measurement data corresponding to image quality for each of the plurality of sub-regions are produced (Step 1501). At that time, the image pattern output to the display device can be implemented in various ways through an image pattern generator, etc (even in case of same image pattern, the luminance for each image pattern can be different). Here, an image pattern output as a white level for the entire screen will be explained as an example. In addition, as measurement data produced with respect to each of the plurality of sub-regions, either luminance or chromaticity data is basically available. Moreover, basic optical luminance and chromaticity data can be detected from the display device by image acquisition such as the 2-CCD luminance meter & colorimeter.

Here, the luminance data detected from the screen region of the display device can be expressed by the following matrix form depending on a detection position:

$$\begin{bmatrix} L_{11} & L_{12} & \ldots & L_{1n} \\ L_{21} & L_{22} & \ldots & L_{2n} \\ \ldots & \ldots & \ldots & \ldots \\ L_{m1} & L_{m2} & \ldots & L_{mn} \end{bmatrix}$$

Also, the chromaticity data detected from the screen region of the display device can be expressed by the following matrix form depending on a detection position.

$$\begin{bmatrix} (x,y)_{11} & (x,y)_{12} & \ldots & (x,y)_{1n} \\ (x,y)_{21} & (x,y)_{22} & \ldots & (x,y)_{2n} \\ \ldots & \ldots & \ldots & \ldots \\ (x,y)_{m1} & (x,y)_{m2} & \ldots & (x,y)_{mn} \end{bmatrix}$$

With reference to the optical luminance/chromaticity data detected through the image acquisition portion, color difference ($\Delta Euv$) data representing a difference of color sense felt by humans is calculated, and the calculated color difference data can be used to perform the image quality analysis for the display device. When the color difference data is obtained, a particular point, for example, a center point in the screen display region can be selected as a reference point. In addition, when the measurement data is calculated from the display device, the screen display region is divided into pixel units, and the measurement data can be calculated with respect to the pixel units. Further, of the pixel units, the measurement data can be calculated with respect to each pixel unit positioned at prescribed equal intervals from a basis pixel of the respective pixel unit.

With reference to the above produced luminance data and chromaticity data of the display device, the color difference ($\Delta Euv$) data produced from the screen display region can be expressed by the following matrix form:

$$\begin{bmatrix} \Delta Euv_{11} & \Delta Euv_{12} & \ldots & \Delta Euv_{1n} \\ \Delta Euv_{21} & \Delta Euv_{22} & \ldots & \Delta Euv_{2n} \\ \ldots & \ldots & \ldots & \ldots \\ \Delta Euv_{m1} & \Delta Euv_{m2} & \ldots & \Delta Euv_{mn} \end{bmatrix}$$

With this exemplary image quality analysis method for the display device, it is possible to perform a quantitative image quality analysis using the luminance data, chromaticity data (both of which are detected from the screen display region), and the color difference data (calculated from the luminance data and the chromaticity data).

On the other hand, in Step 1501, the first measurement data detected from the screen region of the display device to which the reference image pattern is output can be expressed by the following matrix form depending on a detection position:

$$\begin{bmatrix} R_{11} & R_{12} & \ldots & R_{1n} \\ R_{21} & R_{22} & \ldots & R_{2n} \\ \ldots & \ldots & \ldots & \ldots \\ R_{m1} & R_{m2} & \ldots & R_{mn} \end{bmatrix}$$

In addition, after Step 1501, an image pattern for measurement of dim having relatively very weak luminance compared to the reference image pattern is output, the screen display region to which the image pattern for measurement of dim is output is divided into a plurality of sub-regions, and second measurement data are produced for each of the plurality of sub-regions (Step 1502). The reference image pattern and the image pattern for measurement of dim are formed to have same pattern. The image pattern for measurement of dim uses an image pattern having relatively low luminance. Here, a case that an image pattern having a half gray is output to the whole screen will be explained as a basis.

In Step 1502, the second measurement data detected from the screen region of the display device to which the image pattern for measurement of dim is output can be expressed by the following matrix form depending on a detection position:

$$\begin{bmatrix} D_{11} & D_{12} & \ldots & D_{1n} \\ D_{21} & D_{22} & \ldots & D_{2n} \\ \ldots & \ldots & \ldots & \ldots \\ D_{m1} & D_{m2} & \ldots & D_{mn} \end{bmatrix}$$

Here, positions of particular pixel units at which the second measurement data are detected are selected to become equal to positions of particular pixel units at which the first measurement data are detected. Namely, data detection positions are adjusted such that the positions of particular pixel units at which the first measurement data $R_{11}$, $R_{12}$ . . . is detected become respectively equal to the positions of particular pixel units at which the second measurement data $D_{11}$, $D_{12}$ . . . is detected.

Then, using the detected first measurement data $R_{11}$, $R_{12}$ . . . and the detected second measurement data $D_{11}$, $D_{12}$ . . ., the image pattern displayed on the screen display region is normalized, and the dim badness of the display device is quantitatively detected from the normalized image pattern (Step 1503).

Here, in normalizing the image pattern displayed on the screen display region using the detected first measurement data and the detected second measurement data, one of the first measurement data and the second measurement data is selected, and the other is divided by the selected one. The division of the second measurement data by the first measurement data will be described as an example.

Data produced through such a normalization procedure can be expressed by the following matrix form:

$$\begin{bmatrix} \frac{D_{11}}{R_{11}} & \frac{D_{12}}{R_{12}} & \cdots & \frac{D_{13}}{R_{13}} \\ \frac{D_{21}}{R_{21}} & \frac{D_{22}}{R_{22}} & \cdots & \frac{D_{2n}}{R_{2n}} \\ \cdots & \cdots & \cdots & \cdots \\ \frac{D_{m1}}{R_{m1}} & \frac{D_{m2}}{R_{m2}} & \cdots & \frac{D_{mn}}{R_{mn}} \end{bmatrix}$$

Figure 16:
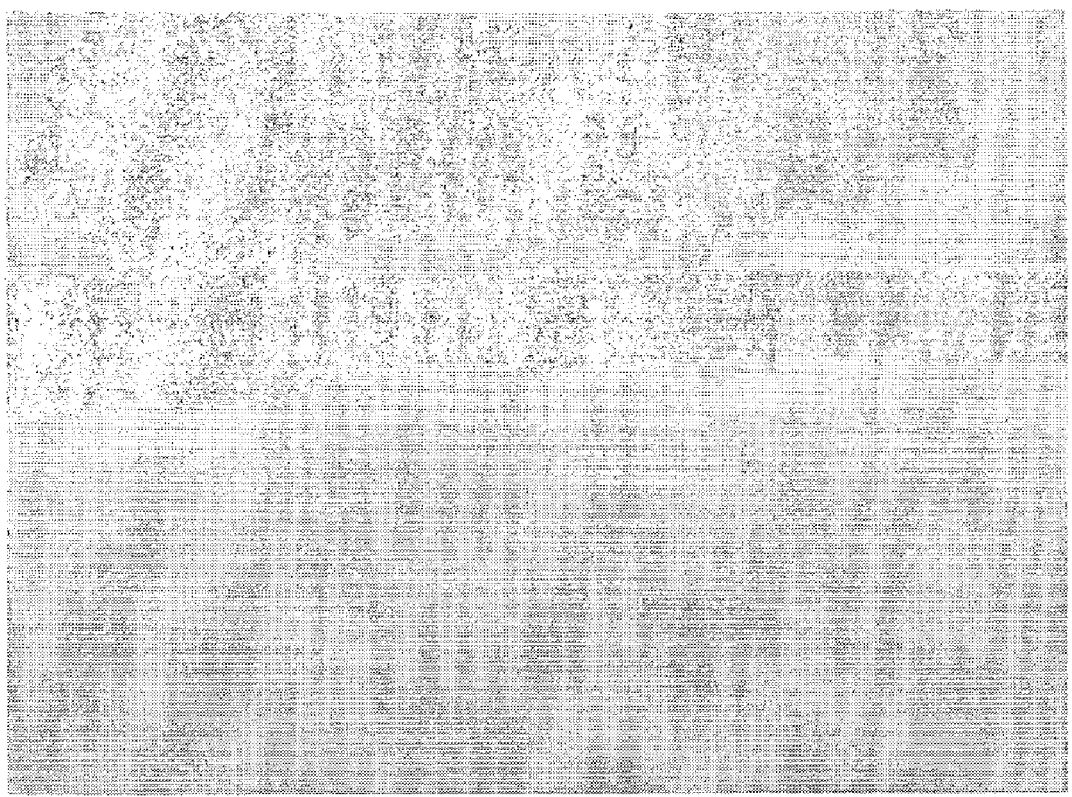
FIG. 16 is a view showing screen output state displayed from data normalized by using first and second measurement data corresponding to an image quality of the display device for which a dim badness is checked through an image quality analysis according to an exemplary embodiment of the present invention.

On the other hand, the screen display region of the display device displayed from the above normalized data appears as shown in FIG. 16. Here, FIG. 16 is a view showing screen output state displayed from data normalized using the first and second measurement data for which a dim badness is checked through an image quality analysis.

FIG. 16 shows an example of the detection of the dim badness, where it can be seen that the dim badness appears in a horizontal direction in the upper portion of the screen. In order to analyze this dim badness quantitatively, the measurement data is obtained from both regions centered on a boundary line at which the dim badness is generated.

Here, if a larger value of the obtained data of measurement of image quality is set to Nmax and a smaller value of the obtained measurement data is set to Nmin, a quantitative level for the dim badness can be expressed by the following equation.

$$\text{Max}_{-dim} = \left( \frac{N_{\max} - N_{\min}}{N_{\max}} \right) \times 100$$

Data should be detected in order to perform the quantitative analysis for this dim badness. Extraction regions of the data can be easily found with reference to FIG. 17. Here, FIG. 17 is a view for explaining data detection position for quantitatively analyzing the dim badness through an image quality analysis.

Figure 17:
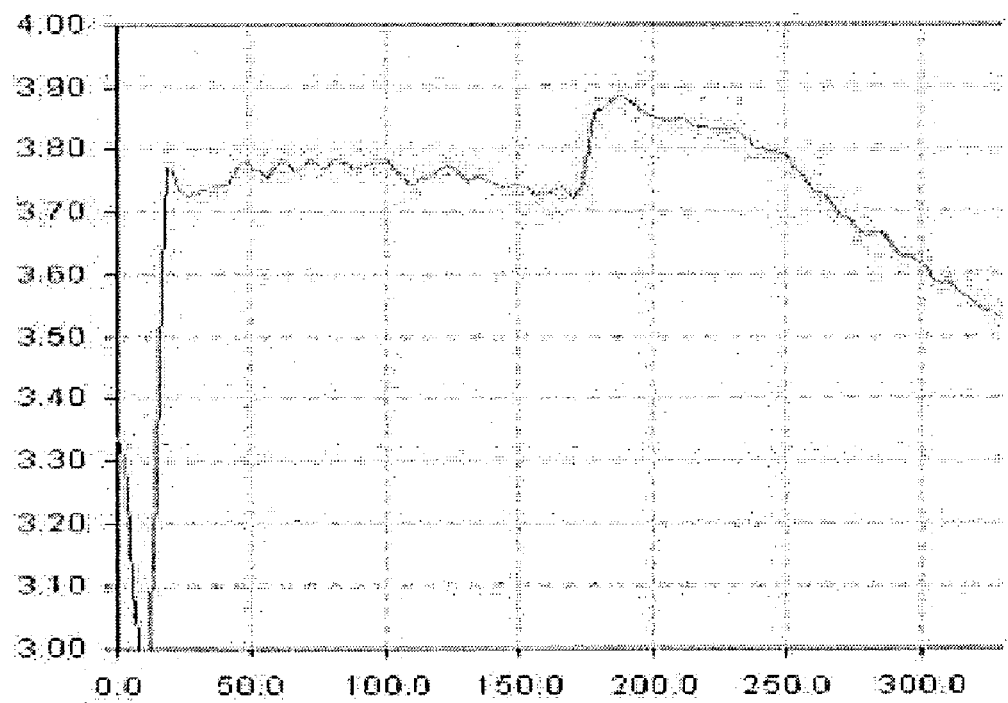
FIG. 17 is a view for explaining data detection position for quantitatively analyzing the dim badness through an image quality analysis for a display device according to an exemplary embodiment of the present invention.

Referring to FIG. 17, when the dim badness is generated in a horizontal line, an analysis result of the measurement data corresponding to image quality for a vertical line is shown in FIG. 17. When a position at which the dim badness is generated (an intermediate sharply varying position) is found from the analysis result, the data for the quantitative analysis are obtained with this position as a boundary line. In addition, when the quantitative evaluation for the dim badness is performed, a plurality measurement data are obtained in both regions centered on the boundary line at which the dim badness is generated. Then, each of averages is calculated by using the obtained plurality of measurement data.

If an average value in a region having larger values is set to N_average_max and an average value in a region having smaller values is set to N_average_min, a quantitative level for the dim badness can be expressed by the following equation.

$$\text{Average}_{-dim} = \left( \frac{(N_{-average-\max}) - (N_{-average-\min})}{(N_{-average-\max})} \right) \times 100$$

A result of the quantitative evaluation analysis for the dim badness as expressed above is shown in Table 3.

TABLE 3

| Division | Analysis samle |
|---|---|
| Max-dim | 4.496 |
| Average-dim | 3.636 |

In addition, when the quantitative evaluation for the dim badness is performed, a ratio of one value to the other value or a difference between two values can be represented as the quantitative level for the dim badness by using Nmax value and Nmin value. Equations representing such a quantitative level can be defined in various ways as follows.

$$\text{Max}_{-dim} = (N_{\max} - N_{\min})$$

$$\text{Max}_{-dim} = \left( \frac{N_{\max}}{N_{\min}} \right)$$

$$\text{Max}_{-dim} = \left( \frac{N_{\min}}{N_{\max}} \right)$$

In addition, when the quantitative evaluation for the dim badness is performed, a ratio of one value to the other value or a difference between two values can be represented as the quantitative level for the dim badness by using N_average_max value and N_average_min value. Equations representing such a quantitative level can be defined in various ways as follows.

$$\text{Average}_{-dim} = ((N_{-average-\max}) - (N_{-average-\min}))$$

$$\text{Average}_{-dim} = \left( \frac{N_{-average-\max}}{N_{-average-\min}} \right)$$

$$\text{Average}_{-dim} = \left( \frac{N_{-average-\min}}{N_{-average-\max}} \right)$$

Through the procedures as described above, the dim badness for the display device can be quantitatively evaluated.

Figure 18:
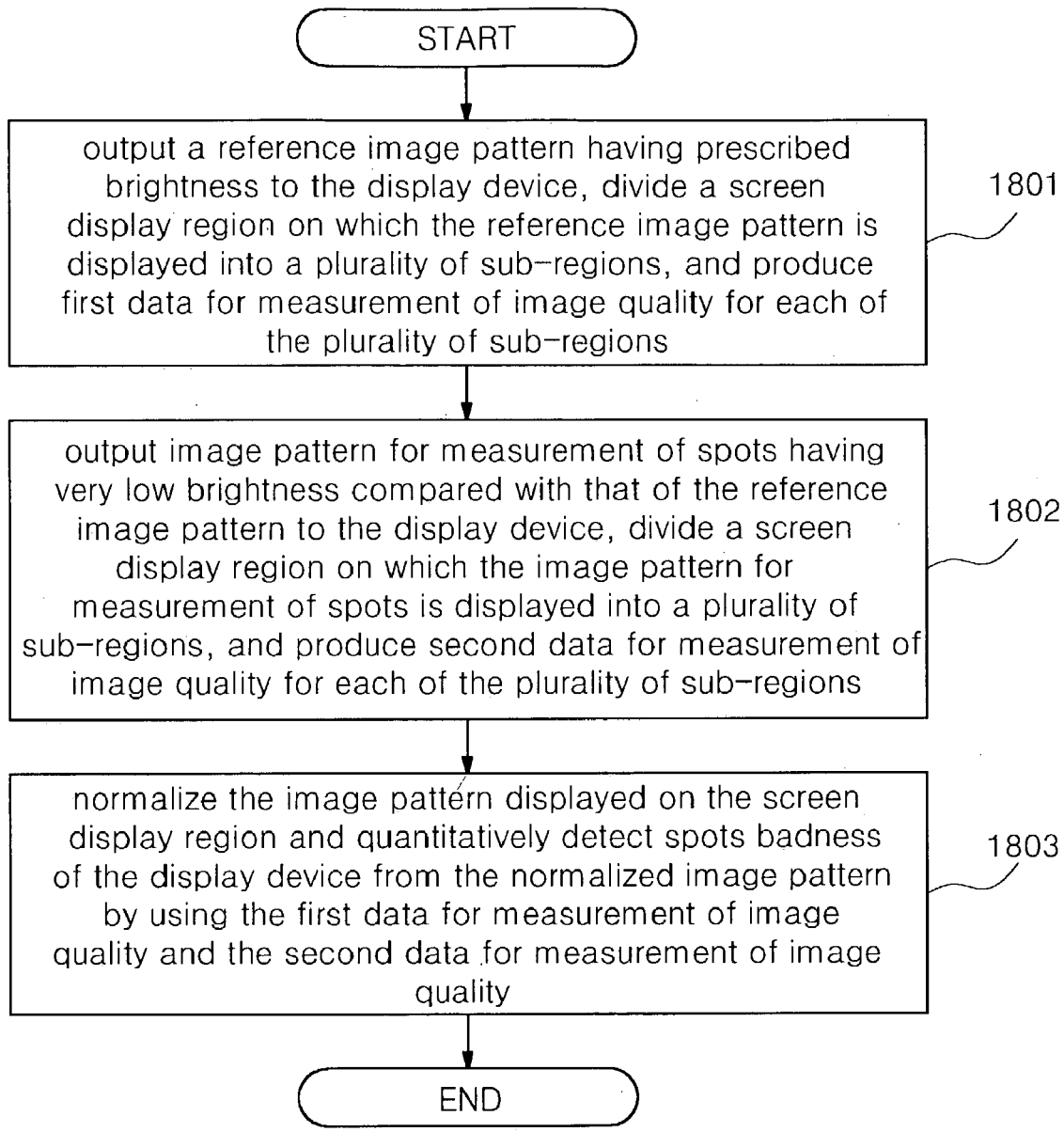
FIG. 18 is a flow chart for explaining a procedure of quantifying bad spots of a display device through an image quality analysis according to an exemplary embodiment of the present invention.

FIG. 18 is a flow chart for explaining a procedure of quantifying a spots badness level of the display device through an image quality analysis. Then, with reference to FIG. 18, as still another analysis example of an image quality analysis method for the display device according to the present invention, a method of quantifying a spots badness level will be considered.

First, a reference image pattern having predetermined luminance is output to the display device, a screen display region on which the reference image pattern is displayed is divided into a plurality of sub-regions, and first measurement data corresponding to image quality for each of the plurality of sub-regions are produced (Step 1801). The image pattern output to the display device can be implemented in various ways through an image pattern generator, etc (even in case of same image pattern, the luminance for each image pattern can be different). Here, a case where the image pattern is output as a white level for the entire screen will be explained as an example.

As the measurement data produced with respect to each of the plurality of sub-regions, either luminance or chromaticity data is basically available. At that time, basic optical luminance and chromaticity data can be detected from the display device by image acquisition such as with a 2-CCD luminance meter & colorimeter.

In addition, as the measurement data produced with respect to each of the plurality of sub-regions, color difference data calculated from the luminance and chromaticity data is available. When the measurement data is calculated from the display device, the screen display region is divided into pixel units, and the measurement data can be calculated with respect to the pixel units. Of the pixel units, the measurement data can be calculated with respect to each pixel unit positioned at prescribed equal intervals from a basis pixel of each respective pixel unit.

In Step 1801, the first measurement data detected from the screen region of the display device to which the reference image pattern is output can be expressed by the following matrix form depending on a detection position:

$$\begin{bmatrix} R_{11} & R_{12} & \cdots & R_{1n} \\ R_{21} & R_{22} & \cdots & R_{2n} \\ \cdots & \cdots & \cdots & \cdots \\ R_{m1} & R_{m2} & \cdots & R_{mn} \end{bmatrix}$$

After Step 1801, an image pattern for measurement of spots having relatively very weak luminance compared to the reference image pattern is output, the screen display region to which the image pattern for measurement of spots is output is divided into a plurality of sub-regions, and second measurement data is produced for each of the plurality of sub-regions (Step 1802).

At that time, the reference image pattern and the image pattern for measurement of spots are formed having the same pattern. The image pattern for measurement of spots uses an image pattern having relatively low luminance. Here, an image pattern having a half gray output to the whole screen will be explained as an example.

In Step 1802, the second measurement data corresponding to image quality detected from the screen region of the display device to which the image pattern for measurement of spots is output can be expressed by the following matrix form depending on a detection position:

$$\begin{bmatrix} M_{11} & M_{12} & \cdots & M_{1n} \\ M_{21} & M_{22} & \cdots & M_{2n} \\ \cdots & \cdots & \cdots & \cdots \\ M_{m1} & M_{m2} & \cdots & M_{mn} \end{bmatrix}$$

Here, positions of particular pixel units of the detected second measurement data are selected to become equal to positions of particular pixel units of the detected first measurement data. Namely, data detection positions are adjusted such that the positions of particular pixel units at which the first measurement data $R_{11}, R_{12} \ldots$ are detected become respectively equal to the positions of particular pixel units at which the second measurement data $M_{11}, M_{12} \ldots$ are detected.

Then, using the detected first measurement data $R_{11}, R_{12} \ldots$ and the detected second measurement data $M_{11}, M_{12} \ldots$, the image pattern displayed on the screen display region is normalized and the spots badness of the display device is quantitatively detected from the normalized image pattern (Step 1803). In normalizing the image pattern displayed on the screen display region by using the detected first measurement data and the detected second measurement data, one of the first and second measurement data is selected and the other is divided by the selected one. The division of the second measurement data by the first measurement data will be described as an example. Data produced through such a normalization procedure can be expressed by the following matrix form:

$$\begin{bmatrix} \frac{M_{11}}{R_{11}} & \frac{M_{12}}{R_{12}} & \cdots & \frac{M_{1n}}{R_{13}} \\ \frac{M_{21}}{R_{21}} & \frac{M_{22}}{R_{22}} & \cdots & \frac{M_{2n}}{R_{2n}} \\ \cdots & \cdots & \cdots & \cdots \\ \frac{M_{m1}}{R_{m1}} & \frac{M_{m2}}{R_{m2}} & \cdots & \frac{M_{mn}}{R_{mn}} \end{bmatrix}$$

Figure 19:
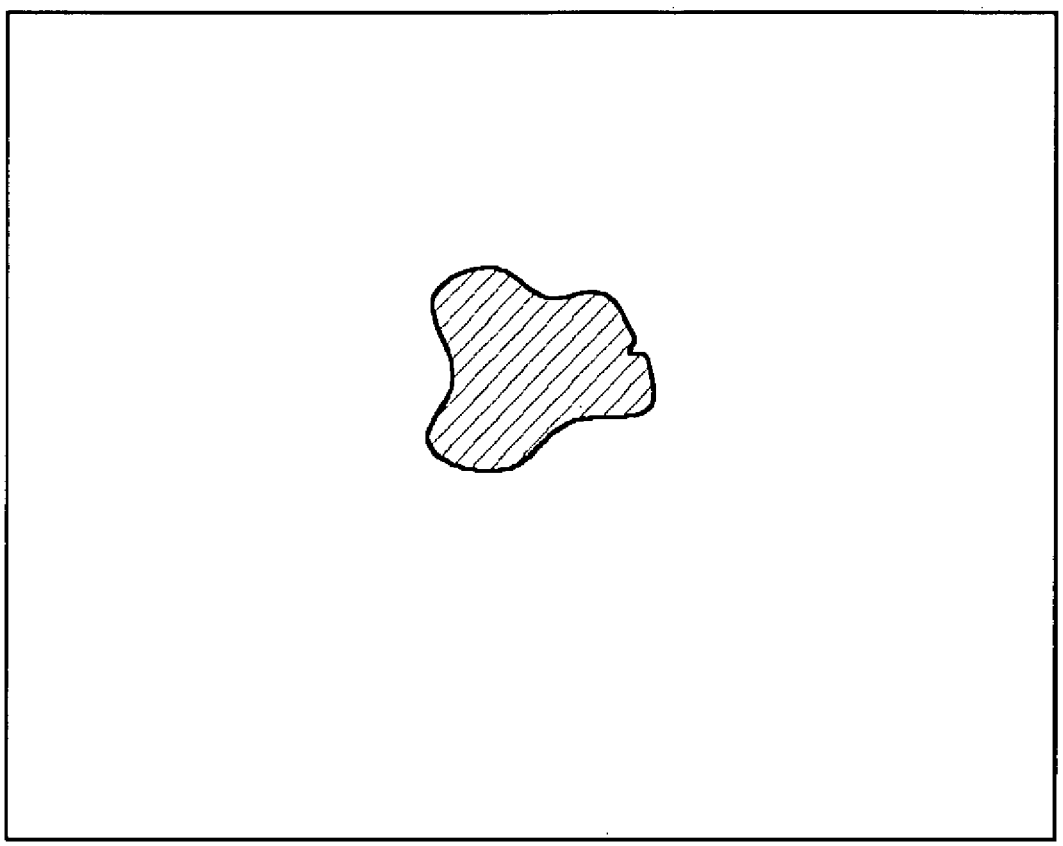
FIG. 19 is a conceptual view showing a screen output state displayed from data normalized using first and second measurement data of an image quality of the display device for which a bad spots are checked performed through an image quality analysis method according to an exemplary embodiment of the present invention.

On the other hand, the screen display region of the display device displayed from the above normalized data appears as shown in FIG. 19. Here, FIG. 19 is a conceptual view showing screen output state displayed from data normalized using the first and second measurement data of the display device for which a spots badness check is performed through an image quality analysis.

FIG. 19 shows an example of the detection of the dim badness, where it can be seen that the spots badness appears in a center portion of the screen. In order to analyze this spots badness quantitatively, the measurement data are obtained from both regions (an inside region and an outside region) centered on a boundary line at which the spots badness is generated.

When the quantitative evaluation for the spots badness is performed, a plurality of measurement data are obtained in both regions centered on the boundary line at which the spots badness is generated. Then, each of averages is calculated using the obtained plurality of measurement data. If an average value in a region having larger values is set to N_average_max and an average value in a region having smaller values is set to N_average_min, a quantitative level for the spots badness can be expressed by the following equation:

$$Average_{-mura} = \left( \frac{(N_{-average-\max}) - (N_{-average-\min})}{(N_{-average-\max})} \right) \times 100$$

In addition, when the quantitative evaluation for the spots badness is performed, a ratio of one value to the other value or a difference between two values can be represented as the quantitative level for the spots badness using the N_average_max value and the N_average_min value. Equations representing such a quantitative level can be defined in various ways as follows:

$$Average_{-mura} = ((N_{-average-max}) - (N_{-average-min}))$$

$$Average_{-mura} = \left(\frac{N_{-average-max}}{N_{-average-min}}\right)$$

$$Average_{-mura} = \left(\frac{N_{-average-min}}{N_{-average-max}}\right)$$

Through the procedures as described above, the spots badness for the display device can be quantitatively evaluated. As described, according to an image quality analysis method and system for the display device according to the present invention, an objective evaluation can be performed for the display device by quantifying the image quality of the display device by objective numerical values. In addition, according to an image quality analysis method and system for the display device according to the present invention, it is possible to propose an objective and fair evaluation criterion between manufacturers and purchasers of the display device by quantifying the uniformity of image quality of the display device by numerical values. In addition, it should be recognized that the image quality analysis method and system of the present invention can be used in conjunction with other analysis techniques including those disclosed by Korean Patent Application No. 2002-27645 which is hereby incorporated by reference.

It will be apparent to those skilled in the art that various modifications and variations can be made in the image quality analysis method and system of the present invention without departing from the spirit or scope of the invention. Thus, it is intended that the present invention cover the modifications and variations of this invention provided they come within the scope of the appended claims and their equivalents.

What is claimed is:

1. An image quality analysis method for a display device, comprising the steps of:
    outputting an image pattern to the display device for a first period of time;
    dividing a screen display region on which the image pattern is displayed into a plurality of sub-regions;
    producing first measurement data corresponding to image quality during the first period of time for the plurality of sub-regions;
    outputting the image pattern to the display device for a second period of time; producing second measurement data corresponding to image quality during the second period of time for the plurality of sub-regions;
    normalizing the image pattern displayed on the screen display region; and
    quantitatively detecting an output level of image sticking of the image pattern from the normalized image pattern using the first measurement data and the second measurement data.

2. The image quality analysis method according to claim 1, wherein the image pattern output to the display device includes a half gray output for the whole screen of the display device.

3. The image quality analysis method according to claim 1, wherein when the first and second measurement data are produced, the screen display region is divided into pixel units and the first and second measurement data are produced with respect to the pixel units.

4. The image quality analysis method according to claim 1, wherein when the first and second measurement data are produced, the screen display region is divided into pixel units and the first and second measurement data are produced with respect to each pixel unit positioned at prescribed equal intervals from a basis pixel of the respective pixel unit.

5. The image quality analysis method according to claim 1, wherein the produced first and second measurement data include luminance data measured from each of the plurality of sub-regions using a luminance meter.

6. The image quality analysis method according to claim 5, wherein the luminance meter includes a 2-dimensional CCD luminance meter.

7. The image quality analysis method according to claim 1, wherein the produced first and second measurement data include chromaticity data measured from each of the plurality of sub-regions using a colorimeter.

8. The image quality analysis method according to claim 7, wherein the colorimeter includes a 2-dimensional CCD colorimeter.

9. The image quality analysis method according to claim 1, wherein the produced first and second measurement data include color difference data calculated from luminance data and chromaticity data measured from each of the plurality of sub-regions using a luminance meter and a colorimeter, respectively.

10. The image quality analysis method according to claim 1, wherein the image pattern for determining image sticking includes an image pattern having an n×m chessboard shape.

11. The image quality analysis method according to claim 10, wherein the image pattern having an n×m chessboard shape generates luminance differences between adjacent locations forming a chessboard pattern.

12. The image quality analysis method according to claim 1, wherein when the image pattern displayed on the screen display region is normalized, one of the first and second measurement data is selected, the other one of the first and second measurement data is divided by the selected one, and a result of the division is displayed as an image on the screen.

13. The image quality analysis method according to claim 1, wherein when the output level of image sticking of the image pattern is quantitatively detected, at least one of a quantitative evaluation for a line image sticking and a quantitative evaluation for a face image sticking are performed.

14. The image quality analysis method according to claim 13, wherein when the quantitative evaluation for the line image sticking is performed, measurement data is obtained in both regions centered on a boundary line at which the line image sticking is generated, data having a largest value of the obtained measurement data is set to Nmax, data having a smallest value of the obtained measurement data is set to Nmin, and a quantitative level for the line image sticking is determined according to:

$$\left(\frac{N_{\max} - N_{\min}}{N_{\max}}\right) \times 100.$$

15. The image quality analysis method according to claim 13, wherein when the quantitative evaluation for the line image sticking is performed, measurement data is obtained in both regions centered on a boundary line at which the line image sticking is generated, data having a largest value of the obtained measurement data is set to Nmax, data having a smallest value of the obtained measurement data is set to Nmin, and a ratio of one of Nmax and Nmin to the other one of Nmax and Nmin or a difference between Nmax and Nmin is determined as the quantitative evaluation for the line image sticking.

16. The image quality analysis method according to claim 13, wherein when the quantitative evaluation for the face image sticking is performed, a plurality of measurement data is obtained in both regions centered on the boundary lines at which the face image sticking is generated, averages are calculated for each of the obtained plurality of measurement data, an average value in a region having a largest value is set to N_average_max, an average value in a region having a smallest value is set to N_average_mm and a quantitative level for the face image sticking is determined according to:

$$\left( \frac{(N_{-average-\max}) - (N_{-average-\min})}{(N_{-average-\max})} \right) \times 100.$$

17. The image quality analysis method according to claim 13, wherein when the quantitative evaluation for the face image sticking is performed, a plurality of measurement data is obtained in both regions centered on the boundary lines at which the face image sticking is generated, averages are calculated for each of the obtained plurality of measurement data, an average value in a region having a largest value is set to N_average _max, an average value in a region having a smallest value is set to N_average_min, a ratio of one of N_average_max and N_average_min to the other one of N_average _max and N_average _min or a difference between N_average_max and N_average_min is determined as the quantitative evaluation for the face image sticking.

18. The image quality analysis method according to claim 1, wherein the display device includes a liquid crystal display device.

19. An image quality analysis method for a display device, comprising the steps of:
outputting a first image pattern having a first brightness to the display device for a first period of time;
dividing a screen display region on which the reference image pattern is displayed into a plurality of sub-regions;
producing first measurement data corresponding to image quality during the first period of time for the plurality of sub-regions;
outputting a second image pattern having a second brightness lower than the first brightness to the display device for a second period of time;
producing second measurement data corresponding to image quality during the second period for the plurality of sub-regions;
normalizing the image pattern displayed on the screen display region; and quantitatively evaluating image badness of the display device from the normalized image pattern using the first measurement data and the second measurement data.

20. The image quality analysis method according to claim 19, wherein the image badness includes at least one of dim badness and spots badness.

21. The image quality analysis method according to claim 19, wherein the first image pattern and the second image pattern have same pattern shape, the first image pattern having a higher luminance than the second image pattern.

22. The image quality analysis method according to claim 19, wherein the first image pattern includes white level output for the whole screen, and the second image pattern includes a half gray output for the whole screen.

23. The image quality analysis method according to claim 19, wherein when the first and second measurement data are produced, the screen display region is divided into pixel units, and the first and second measurement data are produced with respect to the pixel units.

24. The image quality analysis method according to claim 19, wherein when the first and second measurement data are produced, the screen display region is divided into pixel units, and the first and second measurement data are produced with respect to each pixel unit positioned at prescribed equal intervals from a basis pixel of the respective pixel units.

25. The image quality analysis method according to claim 19, wherein the produced first and second measurement data include luminance data measured from the plurality of sub-regions using a luminance meter.

26. The image quality analysis method according to claim 25, wherein the luminance meter includes a 2-dimensional CCD luminance meter.

27. The image quality analysis method according to claim 19, wherein when the image pattern displayed on the screen display region is normalized, one of the first and second measurement data is selected, the other one of the first and second measurement data is divided by the selected one, and a result of the division is displayed as an image on the screen.

28. The image quality analysis method according to claim 19, wherein when the image badness is quantitatively evaluated, measurement data is obtained in both regions centered on a boundary line at which the dim badness generated, and if data having a largest value of the obtained measurement data set to Nmax, data having a smallest value of the obtained measurement data is set to Nmin, a quantitative level for the image badness is determined according to:

$$\left( \frac{N_{\max} - N_{\min}}{N_{\max}} \right) \times 100.$$

29. The image quality analysis method according to claim 19, wherein when the image badness is quantitatively evaluated, the measurement data is obtained in both regions centered on a boundary line at which the line image sticking is generated, data having a largest value of the obtained measurement data is set to Nmax, data having a smallest value of the obtained measurement data is set to Nmin, a ratio of one of Nmax and Nmin to the other one of Nmax or Nmin or a difference between Nmax and Nmin is determined as a quantitative level for the image badness.

30. The image quality analysis method according to claim 29, wherein the image badness includes dim badness.

31. The image quality analysis method according to claim 19, wherein when the image badness is quantitatively evaluated, a plurality data of measurement data is obtained in both regions centered on the boundary lines at which the image badness is generated, averages is calculated for each of the obtained plurality of measurement data, an average value in a region having a largest value is set to N_average_max, an average value in a region having a smallest value is set to N_average_min, and a quantitative level for the image badness is determined according to:

$$\left(\frac{(N_{-average-\max}) - (N_{-average-\min})}{(N_{-average-\max})}\right) \times 100.$$

32. The image quality analysis method according to claim 19, wherein when the image badness is quantitatively evaluated, a plurality of measurement data is obtained in both regions centered on the boundary lines at which the image badness is generated, averages are calculated for each of the obtained plurality of measurement data, an average value in a region having a largest value is set to N_average_max, an average value in a region having a smallest value is set to N_average_min, and a ratio of one of N_average_max and N_average_min to the other one of N_average_max and N average_min or a difference between N_average_max and N_average_min is determined as a quantitative level for the image badness.

33. The image quality analysis method according to claim 19, wherein the display device includes a liquid crystal display device.

34. An image quality analysis system for a display device of which image quality is to be analyzed, comprising:

an image acquisition portion to detect first optical data of a first image displayed on a screen display region of the display device for a first period of time and to detect second optical data of a second image different from the first image displayed on the screen display region of the display device for a second period of time. the first and second optical data each corresponding to a plurality of sub-regions of the screen display region;

a data processor to produce first and second measurement data corresponding to image quality of the plurality of sub-regions of the screen display region respectively using the first and second optical data detected by the image acquisition portion; and an image quality level detector to normalize the image pattern displayed on the screen display region and to quantitatively evaluate an image quality level of the display device from the normalized image pattern using the first and second measurement data produced from the data processor for the first and second images output to the display device.

35. The image quality analysis system according to claim 34, wherein the image acquisition portion includes a CCD luminance meter/colorimeter.

36. The image quality analysis system according to claim 34, wherein the first and second measurement data produced from the data processor includes luminance data.

37. The image quality analysis system according to claim 34, wherein the first and second measurement data produced from the data processor includes chromaticity data.

38. The image quality analysis system according to claim 34, wherein the first and second measurement data produced from the data processor includes color difference data calculated from at least luminance data and chromaticity data.

39. The image quality analysis system according to claim 34, wherein the display device includes a liquid crystal display device.

40. The image quality analysis system according to claim 34, wherein the image quality level evaluated by the image quality level detector includes a quantitative image evaluation for at least one of image sticking and image badness of the display device.

41. The image quality analysis system according to claim 40, wherein the image badness includes at least of dim badness and spots badness.

* * * * *